United States Patent
Takahashi et al.

(10) Patent No.: US 11,705,841 B2
(45) Date of Patent: Jul. 18, 2023

(54) ESTIMATION DEVICE AND AC MOTOR DRIVE DEVICE

(71) Applicant: Mitsubishi Electric Corporation, Tokyo (JP)

(72) Inventors: Kenji Takahashi, Tokyo (JP); Shinya Toyodome, Tokyo (JP); Mitsuo Kashima, Tokyo (JP); Tomohiro Kutsuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 46 days.

(21) Appl. No.: 17/625,096

(22) PCT Filed: Aug. 23, 2019

(86) PCT No.: PCT/JP2019/033182
§ 371 (c)(1),
(2) Date: Jan. 6, 2022

(87) PCT Pub. No.: WO2021/038670
PCT Pub. Date: Mar. 4, 2021

(65) Prior Publication Data
US 2022/0294377 A1    Sep. 15, 2022

(51) Int. Cl.
*H02P 21/18* (2016.01)
*H02P 21/24* (2016.01)

(52) U.S. Cl.
CPC .............. *H02P 21/18* (2016.02); *H02P 21/24* (2016.02)

(58) Field of Classification Search
CPC .. H02P 21/18; H02P 21/24; H02P 6/18; H02P 6/34; H02P 23/14
See application file for complete search history.

(56) References Cited

U.S. PATENT DOCUMENTS

| 6,628,099 | B2 | 9/2003 | Iwaji et al. | |
| 6,650,081 | B2 | 11/2003 | Iwaji et al. | |
| 2010/0127648 | A1 * | 5/2010 | Akiyama | H02P 21/14 318/400.11 |

FOREIGN PATENT DOCUMENTS

| CN | 107681929 A * | 2/2018 | ............. F24F 11/86 |
| JP | 3668870 B2 | 7/2005 | |

(Continued)

OTHER PUBLICATIONS

International Search Report and Written Opinion dated Nov. 12, 2019, received for PCT Application PCT/JP2019/033182, Filed on Aug. 23, 2019, 8 pages including English Translation.

(Continued)

*Primary Examiner* — Bickey Dhakal
(74) *Attorney, Agent, or Firm* — Xsensus LLP

(57) ABSTRACT

An estimation device includes a phase current determination unit, a time difference calculation unit, and an estimation unit. The phase current determination unit performs a determination process for determining values of phase currents based on the value of the bus current detected by a bus current detection unit and states of gate pulse signals. The time difference calculation unit calculates a difference between a detection time of the bus current used in a previous determination process and a detection time of the bus current used in a present determination process. The estimation unit estimates at least one of a position and a speed of an AC motor based on the values of the phase currents determined by the phase current determination unit and the difference calculated by the time difference calculation unit.

9 Claims, 18 Drawing Sheets

(56) References Cited

FOREIGN PATENT DOCUMENTS

| JP | 2015-139359 A |   | 7/2015 |
|----|---------------|---|--------|
| JP | 2015139360 A  | * | 7/2015 |
| JP | 2016103886 A  | * | 6/2016 |

OTHER PUBLICATIONS

Indian Office Action dated Jul. 5, 2022, in Indian Application No. 202227008454.
Sri Y.P.Obulesu et al., "Design and Simulation of Field Oriented Control of VSI Fed Induction Motor Drive", JNTU College of engineering, Anantapur-515002, pp. 1-10.
P. Divyasree, et al., "Vector control of voltage source inverter fed induction motor drive using space vector PWM technique," 2017 International Conference on Energy, Communication, Data Analytics and Soft Computing (ICECDS), 2017, pp. 2946-2951, doi:10.1109/ICECDS.2017.8389996.

* cited by examiner

BUS CURRENT
=u-PHASE CURRENT

BUS CURRENT
=w-PHASE CURRENT

ESTIMATION DEVICE AND AC MOTOR DRIVE DEVICE

CROSS-REFERENCE TO RELATED APPLICATION

The present application is based on PCT filing PCT/JP2019/033182, filed Aug. 23, 2019, the entire contents of which are incorporated herein by reference.

FIELD

The present invention relates to an estimation device that estimates at least one of the position and the speed, of an AC motor, and to an AC motor drive device.

BACKGROUND

Information indicating the position of the rotor is used in driving an AC motor such as an induction machine or a synchronous machine. The use of a position sensor or a speed sensor for acquiring information indicating the position of the rotor presents a problem of an increase in manufacturing cost, for example. In view of such a problem, regarding AC motor drive devices, many studies have been made on position sensorless control, which does not use position sensors or speed sensors.

In addition, regarding AC motor drive devices, many studies have been made on reduction of the number of current sensors in order to reduce manufacturing cost, among which one-shunt current detection has been widely used as an inexpensive current detection method. One-shunt current detection is a method for measuring a phase current flowing through the AC motor, using a current sensor provided on the DC bus of the inverter. The reason why the method for measuring a phase current using a current sensor provided on the DC bus is called one-shunt current detection is that the current sensor is often implemented by a shunt resistor. However, a current sensor other than a shunt resistor may be used as the current sensor provided on the DC bus, in which case the method using the other current sensor is still generally called one-shunt current detection. A known example of this type of one-shunt current detection uses a current sensor called a current transformer (CT) different from a shunt resistor.

Patent Literature 1 discloses a technique for driving an AC motor using position sensorless control and one-shunt current detection in combination. In one-shunt current detection, currents of different phases cannot be simultaneously detected at a vertex of the carrier signal. In view of this, the technique described in Patent Literature 1 involves performing interpolation processing on phase currents obtained from the bus current in the second half of a first carrier period and the first half of a second carrier period following the first carrier cycle, thereby calculating phase currents at the vertex of the carrier signal which is the timing of the boundary between the first carrier period and the second carrier period. The technique described in Patent Literature 1 further involves generating a voltage command on the basis of the phase currents at the vertex of the carrier signal, and calculating information indicating the rotation state of the rotor of the AC motor on the basis of the generated voltage command. The information indicating the rotation state of the rotor is at least one of the position and the speed of the rotor.

CITATION LIST

Patent Literature

Patent Literature 1: Japanese Patent Application Laid-open No. 2015-139359

SUMMARY

Technical Problem

The technique described in Patent Literature 1 uses the bus current detected in each of the second half of the first carrier period and the first half of the second carrier period following the first carrier period. Depending on the timing when a plurality of switching elements of the inverter switch between on states and off states, it may be difficult to obtain three-phase currents from the bus current in both the first half and the second half of the carrier periods. For the technique described in Patent Literature 1, thus, the period of detection of phase currents for use in calculating the rotation state of the rotor of the AC motor is twice or more a carrier period. Given that, in general, inverter switching loss increases with an increase in carrier frequency, there is generally an upper limit on the carrier frequency in view of the cooling performance or power efficiency of the AC motor drive device. As the rotation frequency of the AC motor approaches the carrier frequency, the control period becomes longer relative to the rotation frequency of the AC motor, which may make it difficult to secure the estimation accuracy of the rotation state of the rotor included in the AC motor.

The present invention has been made in view of the above, and an object thereof is to obtain an estimation device capable of improving the estimation accuracy of at least one of the position and the speed of an AC motor.

Solution to Problem

In order to solve the above-described problems and achieve the object, an estimation device of the present invention comprises a bus current detection unit, a phase current determination unit, a time difference calculation unit, and an estimation unit. The bus current detection unit detects a value of a bus current that is a current flowing through a DC bus of a voltage-source inverter driven by a plurality of gate pulse signals generated on a basis of a voltage command. The phase current determination unit performs a determination process for determining values of a plurality of phase currents supplied from the voltage-source inverter to an AC motor on the basis of values of the bus current detected by the bus current detection unit and states of the plurality of gate pulse signals. The time difference calculation unit calculates a time difference between a first current detection time identified as a time of detection of the bus current used in a previous determination process by the phase current determination unit and a second current detection time identified as a time of detection of the bus current used in a present determination process by the phase current determination unit. The estimation unit estimates at least one of a position and a speed, of the AC motor on the basis of the values of the plurality of phase currents determined by the phase current determination unit and the time difference calculated by the time difference calculation unit.

Advantageous Effects of Invention

The present invention can achieve the effect of improving the estimation accuracy of at least one of the position and the speed of the AC motor.

DESCRIPTION OF EMBODIMENTS

Hereinafter, an estimation device and an AC motor drive device according to embodiments of the present invention will be described in detail on the basis of the drawings. The present invention is not limited to the embodiments.

First Embodiment

Figure 1:
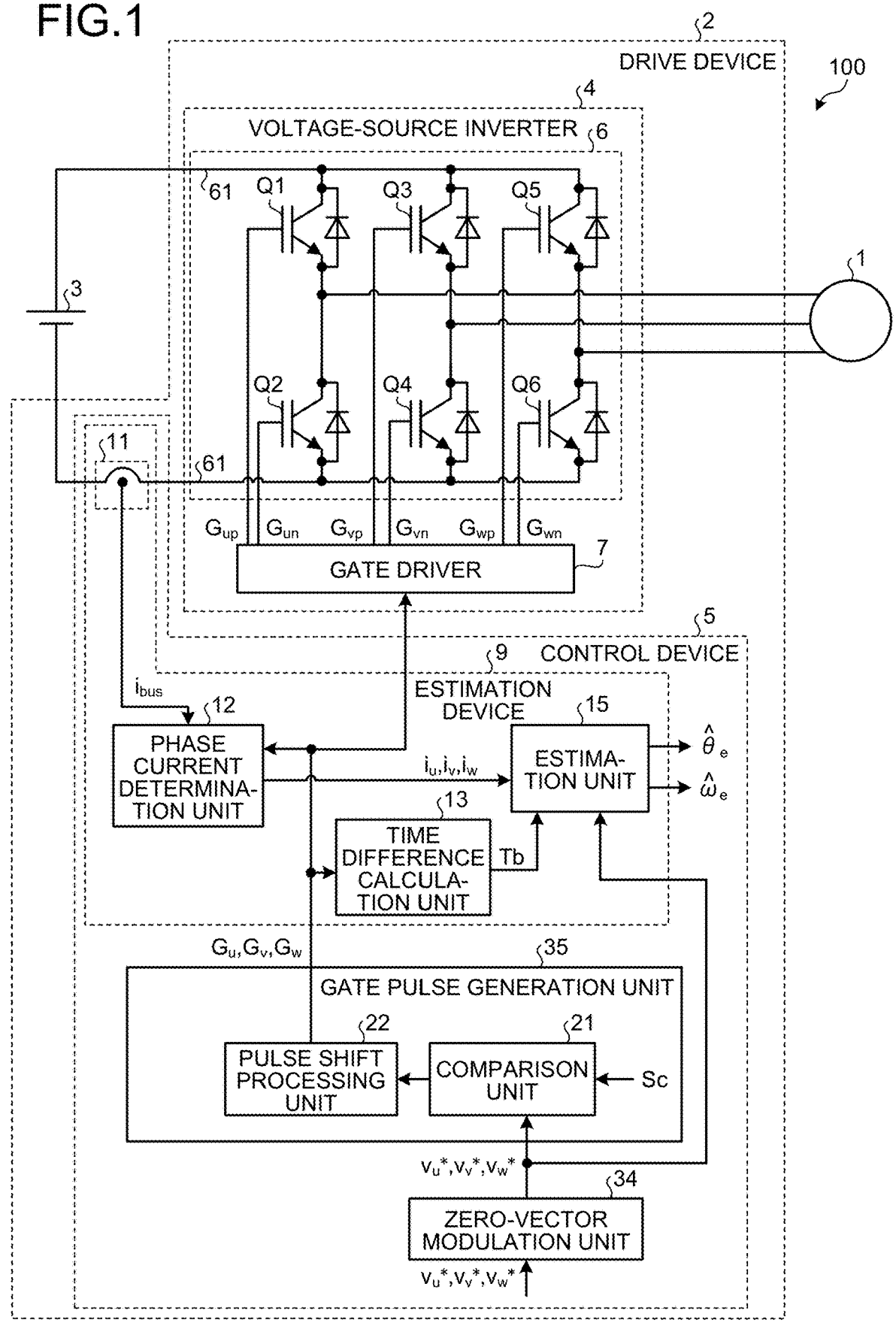
FIG. 1 is a diagram illustrating an exemplary configuration of an electric motor system including an estimation device according to a first embodiment of the present invention.

FIG. 1 is a diagram illustrating an exemplary configuration of an electric motor system including an estimation device according to the first embodiment of the present invention. As illustrated in FIG. 1, the electric motor system 100 according to the first embodiment includes an AC motor 1 and a drive device 2 that drives the AC motor 1.

The AC motor 1 is a permanent magnet synchronous motor having permanent magnets provided on the rotor, but may be a wound field type synchronous motor having field windings wound around the rotor, or a reluctance type synchronous motor that obtains rotational torque using the saliency of the rotor. In addition, the permanent magnet arrangement of the AC motor 1 may be either embedded type or surface type. In the examples discussed hereinbelow, the AC motor 1 is a three-phase AC motor, but may be an AC motor other than the three-phase AC motor. For example, the AC motor 1 may be a two-phase AC motor or a five-phase AC motor.

The drive device 2 includes a voltage-source inverter 4 and a control device 5. The inverter 4 converts a DC voltage supplied from a DC power supply 3 into an AC voltage and outputs the AC voltage to the AC motor 1. The control device 5 controls the voltage-source inverter 4 to drive the AC motor 1. As illustrated in FIG. 1, the voltage-source inverter 4 includes a main circuit 6 and a gate driver 7.

The main circuit 6 includes a plurality of switching elements Q1, Q2, Q3, Q4, Q5, and Q6. In the main circuit 6, the switching elements Q1, Q3, and Q5 each have one end connected to the high potential side of a DC bus 61, and the switching elements Q2, Q4, and Q6 each have one end connected to the low potential side of the DC bus 61. The other ends of the switching element Q1 and the switching element Q2 are connected to each other to form a U-phase leg. The other ends of the switching element Q3 and the switching element Q4 are connected to each other to form a V-phase leg. The other ends of the switching element Q5 and the switching element Q6 are connected to each other to form a W-phase leg.

The voltage-source inverter 4 includes the three-phase bridge circuit including the thus arranged U-phase, V-phase, and W-phase legs. The voltage-source inverter 4 can output an AC voltage of a desired amplitude and a desired frequency by switching the plurality of switching elements Q1, Q2, Q3, Q4, Q5, and Q6 between on and off states. The switching elements Q1, Q2, Q3, Q4, Q5, and Q6 can be hereinafter collectively referred to as the switching elements Q.

Each of the switching elements Q is an insulated gate bipolar transistor (IGBT) incorporating an anti-parallel diode, but may be a metal-oxide-semiconductor field-effect transistor (MOSFET) incorporating an anti-parallel diode. In the following examples, the voltage-source inverter 4 is discussed as a two-level inverter that outputs two levels of voltage, but the voltage-source inverter 4 may be a multi-level inverter that outputs three or more levels of voltage.

The gate driver 7 amplifies gate pulse signals $G_u$, $G_v$, and $G_w$ output from the control device 5, and outputs the amplified gate pulse signals $G_u$, $G_v$, and $G_w$, which are gate pulse signals $G_{up}$, $G_{vp}$, and $G_{wp}$, to the gates of the switching elements Q1, Q3, and Q5. In addition, the gate driver 7 inversely amplifies the gate pulse signals $G_u$, $G_v$, and $G_w$ output from the control device 5, to generate gate pulse signals $G_{un}$, $G_{vn}$, and $G_{wn}$, and outputs the generated $G_{un}$, $G_{vn}$, and $G_{wn}$ to the gates of the switching elements Q2, Q4, and Q6.

When one of the gate pulse signals $G_{up}$ and $G_{un}$ is in an on state, the other is in an off state. Accordingly, when the switching element Q1 is turned on, the switching element Q2 is turned off, and when the switching element Q1 is turned off, the switching element Q2 is turned on. In this manner, the gate pulse signals $G_{up}$ and $G_{un}$ cause the switching elements Q1 and Q2 to operate complementarily. Similarly, the gate pulse signals $G_{vp}$ and $G_{vn}$ cause the switching elements Q3 and Q4 to operate complementarily, and the gate pulse signals $G_{wp}$ and $G_{wn}$ cause the switching elements Q5 and Q6 to operate complementarily. The gate pulse signals $G_u$, $G_v$, $G_w$, $G_{up}$, $G_{un}$, $G_{vp}$, $G_{vn}$, $G_{wp}$, and $G_{wn}$ are in the on states when having high potential levels, and are in the off states when having low potential levels.

In addition, the gate driver 7 has a function of insulating the control device 5 which is a low-voltage system from the main circuit 6 which is a high-voltage system, and has a role in preventing failure of the control device 5 in the event of anomaly in the main circuit 6. The gate pulse signals $G_u$, $G_v$, and $G_w$ can be hereinafter collectively referred to as the gate pulse signals G.

The control device 5 includes a zero-vector modulation unit 34 that performs zero-vector modulation, a gate pulse generation unit 35 that generates the gate pulse signals $G_u$, $G_v$, and $G_w$, and an estimation device 9 that estimates a magnetic pole position $\theta_e$ and a rotational speed $\omega_e$ of the rotor of the AC motor 1. The magnetic pole position $\theta_e$ is the electrical angle of the rotor included in the AC motor 1, and is an example of the position of the AC motor 1. The rotational speed $\omega_e$ is the electrical angular velocity of the rotor included in the AC motor 1, and is an example of the speed of the AC motor 1. The estimation of the magnetic pole position $\theta_e$ may be hereinafter referred to as position estimation, and the estimation of the rotational speed $\omega_e$ may be hereinafter referred to as speed estimation.

The zero-vector modulation unit 34 irregularly changes the output ratio between two types of zero-voltage vectors that are output from the voltage-source inverter 4. The two types of zero-voltage vectors are a first zero-voltage vector and a second zero-voltage vector. The first zero-voltage vector is output from the voltage-source inverter 4 when all the upper-arm switching elements Q1, Q3, and Q5 are in the on states. The second zero-voltage vector is output from the voltage-source inverter 4 when all the upper-arm switching elements Q1, Q3, and Q5 are in the off states.

By irregularly changing the output ratio between the first zero-voltage vector and the second zero-voltage vector, the spectral peak of carrier noise is dispersed so that carrier noise can be reduced. Carrier noise is a noise that occurs as the AC motor 1, the voltage-source inverter 4, or the like vibrates in accordance with the carrier frequency, i.e. the frequency of a carrier wave Sc to be described later. The output ratio between the first zero-voltage vector and the second zero-voltage vector varies depending on the modulation scheme that the gate pulse generation unit 35 uses. Even when the modulation scheme is changed, the output ratio between the first zero-voltage vector and the second zero-voltage vector can be changed by adding the same values to three-phase voltage commands $v_u^*$, $v_v^*$, and $v_w^*$. The voltage command $v_u^*$ is a u-phase voltage command, the voltage command $v_v^*$ is a v-phase voltage command, and the voltage command $v_w^*$ is a w-phase voltage command.

Adding the same positive values to all of the three-phase voltage commands $v_u^*$, $v_v^*$, and $v_w^*$ extends the length of time during which all of the gate pulse signals $G_u$, $G_v$, and $G_w$ are in the on states, and extends the length of time during which the first zero-voltage vector is output from the voltage-source inverter 4. In addition, adding the same negative value to all of the three-phase voltage commands $v_u^*$, $v_v^*$, and $v_w^*$ extends the length of time during which all of the gate pulse signals $G_u$, $G_v$, and $G_w$ are in the off states, and extends the length of time during which the second zero-voltage vector is output from the voltage-source inverter 4.

The zero-vector modulation unit 34 performs zero-vector modulation that irregularly changes the output ratio between the first zero-voltage vector and the second zero-voltage vector by adding a random number value to the three-phase voltage commands $v_u^*$, $v_v^*$, and $v_w^*$. Note that if a preset condition is not satisfied, the zero-vector modulation unit 34 can output the input three-phase voltage commands $v_u^*$, $v_v^*$, and $v_w^*$ as they are to the gate pulse generation unit 35. The preset condition is, for example, that the AC motor 1 is rotating at a preset speed or less. In the presence of settings that do not allow zero-vector modulation, the zero-vector modulation unit 34 can output the input three-phase voltage commands $v_u^*$, $v_v^*$, and $v_w^*$ as they are to the gate pulse generation unit 35.

The gate pulse generation unit 35 generates the gate pulse signals $G_u$, $G_v$, and $G_w$ on the basis of the voltage commands $v_u^*$, $v_v^*$, and $v_w^*$. The gate pulse generation unit 35 outputs the generated gate pulse signals $G_u$, $G_v$, and $G_w$ to the gate driver 7 of the voltage-source inverter 4.

The gate pulse generation unit 35 includes a comparison unit 21 and a pulse shift processing unit 22. The comparison unit 21 compares the carrier wave Sc which is a high-frequency periodic signal with the three-phase voltage commands $v_u^*$, $v_v^*$, and $v_w^*$. The pulse shift processing unit 22 performs shift processing on the gate pulse signals $G_u$, $G_v$, and $G_w$ output from the comparison unit 21. In the examples discussed herein, the carrier wave Sc is a signal of a triangular wave, but may be a signal of a different waveform such as a sawtooth wave. The carrier wave Sc is also referred to as the carrier signal.

The comparison unit 21 turns on the gate pulse signal $G^u$ when the instantaneous value of the voltage command $v^u*$ is less than or equal to the instantaneous value of the carrier wave Sc. The comparison unit 21 turns off the gate pulse signal $G^u$ when the instantaneous value of the voltage command $v_u*$ is larger than the instantaneous value of the carrier wave Sc. The comparison unit 21 turns on the gate pulse signal $G_v$ when the instantaneous value of the voltage command $v_v*$ is less than or equal to the instantaneous value of the carrier wave Sc. The comparison unit 21 turns off the gate pulse signal $G_v$ when the instantaneous value of the voltage command $v_v*$ is larger than the instantaneous value of the carrier wave Sc. The comparison unit 21 turns on the gate pulse signal $G_w$ when the instantaneous value of the voltage command $v_w*$ is less than or equal to the instantaneous value of the carrier wave Sc. The comparison unit 21 turns off the gate pulse signal $G_w$ when the instantaneous value of the voltage command $v_w*$ is larger than the instantaneous value of the carrier wave Sc.

In the above-described example, the gate pulse generation unit 35 generates the gate pulse signals $G_u$, $G_v$, and $G_w$ using carrier comparison modulation, but the method of generating the gate pulse signals $G^u$, $G_v$, and $G_w$ is not limited to that carrier comparison modulation. For example, the gate pulse generation unit 35 may generate the gate pulse signals $G^u$, $G_v$, and $G_w$ using another modulation scheme such as spatial vector modulation, instead of the carrier comparison modulation. In addition, the gate pulse generation unit 35 may generate the gate pulse signals $G_{up}$, $G_{un}$, $G_{vp}$, $G_{vn}$, $G_{wp}$, and $G_{wn}$ instead of the gate pulse signals $G^u$, $G_v$, and $G_w$. In this case, the gate driver 7 amplifies the gate pulse signals $G_{up}$, $G_{un}$, $G_{vp}$, $G_{vn}$, $G_{wp}$, and $G_{wn}$. The gate driver 7 outputs the amplified gate pulse signals $G_{up}$, $G_{un}$, $G_{vp}$, $G_{vn}$, $G_{wp}$, and $G_{wn}$ to the gates of the switching elements Q1, Q2, Q3, Q4, Q5, and Q6.

The pulse shift processing unit 22 performs the pulse shift processing for shifting the timing at which to switch the gate pulse signal $G_u$, $G_v$, or $G_w$ between the on state and the off state. The pulse shift processing by the pulse shift processing unit 22 will be described in detail later.

The estimation device 9 estimates the magnetic pole position $\theta_e$ and the rotational speed $\omega_e$ of the AC motor 1 on the basis of the gate pulse signals $G_u$, $G_v$, and $G_w$ and the voltage commands $v_u*$, $v_v*$, and $v_w*$. The estimation device 9 can also estimate either the magnetic pole position $\theta_e$ or the rotational speed $\omega_e$ of the AC motor 1.

The estimation device 9 includes a bus current detection unit 11, a phase current determination unit 12, and a time difference calculation unit 13. The bus current detection unit 11 detects the value of a bus current $i_{bus}$. The phase current determination unit 12 determines the values of phase currents $i_u$, $i_v$, and $i_w$. The time difference calculation unit 13 calculates a time difference Tb (described later) on the basis of the gate pulse signals $G_u$, $G_v$, and $G_w$. In addition, the estimation device 9 includes an estimation unit 15. The estimation unit 15 estimates the magnetic pole position $\theta_e$ and the rotational speed $\omega_e$ on the basis of the time difference Tb calculated by the time difference calculation unit 13, the values of the phase currents $i_u$, $i_v$, and $i_w$ determined by the phase current determination unit 12, and the voltage commands $v_u*$, $v_v*$, and $v_w*$.

The value of the bus current $i_{bus}$ detected by the bus current detection unit 11 is the instantaneous value of the bus current, i.e. the current flowing through the DC bus 61 between the DC power supply 3 and the voltage-source inverter 4. The bus current detection unit 11 may be a current sensor of a type using a current transformer called CT or a current sensor of a type using a shunt resistor. The value of the bus current $i_{bus}$ may be hereinafter simply referred to as the bus current $i_{bus}$.

In the example illustrated in FIG. 1, the bus current detection unit 11 is provided on the low potential side of the DC bus 61 and detects the value of the current flowing through the low potential side of the DC bus 61, but may be provided on the high potential side of the DC bus 61. In a case where the bus current detection unit 11 is a current sensor of a type using a shunt resistor, providing the bus current detection unit 11 on the low potential side of the DC bus 61 is advantageous in reducing the cost of insulating circuit parts in the bus current detection unit 11.

The phase current determination unit 12 determines the values of the phase currents $i_u$, $i_v$, and $i_w$ on the basis of the value of the bus current $i_{bus}$ detected by the bus current detection unit 11. The values of the phase currents $i_u$, $i_v$, and $i_w$ determined by the phase current determination unit 12 are the instantaneous values of three phase currents, namely u-phase, v-phase, and w-phase currents flowing between the voltage-source inverter 4 and the AC motor 1. Hereinafter, the phase current $i_u$ may be referred to as the u-phase current $i_u$, the phase current $i_v$ may be referred to as the v-phase current $i_v$, and the phase current $i_w$ may be referred to as the w-phase current $i_w$. The values of the phase currents $i_u$, $i_v$, and $i_w$ may be simply referred to as the phase currents $i_u$, $i_v$, and $i_w$.

Figure 2:
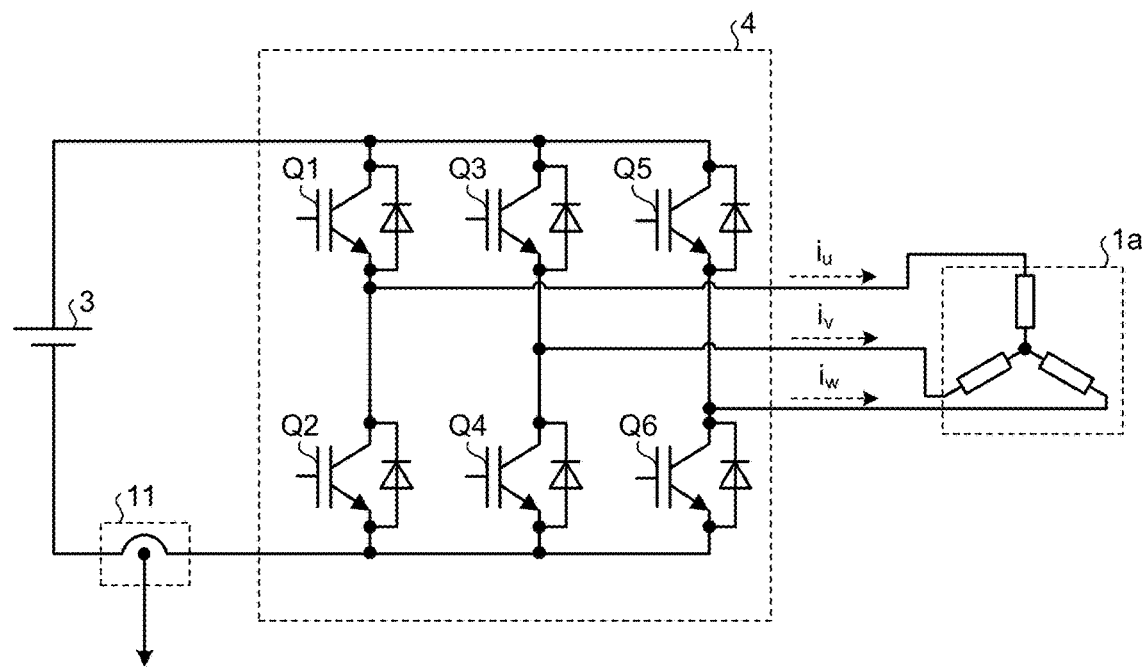
FIG. 2 is a diagram for explaining a method for determining the values of phase currents by a phase current determination unit according to the first embodiment.
Figure 3:
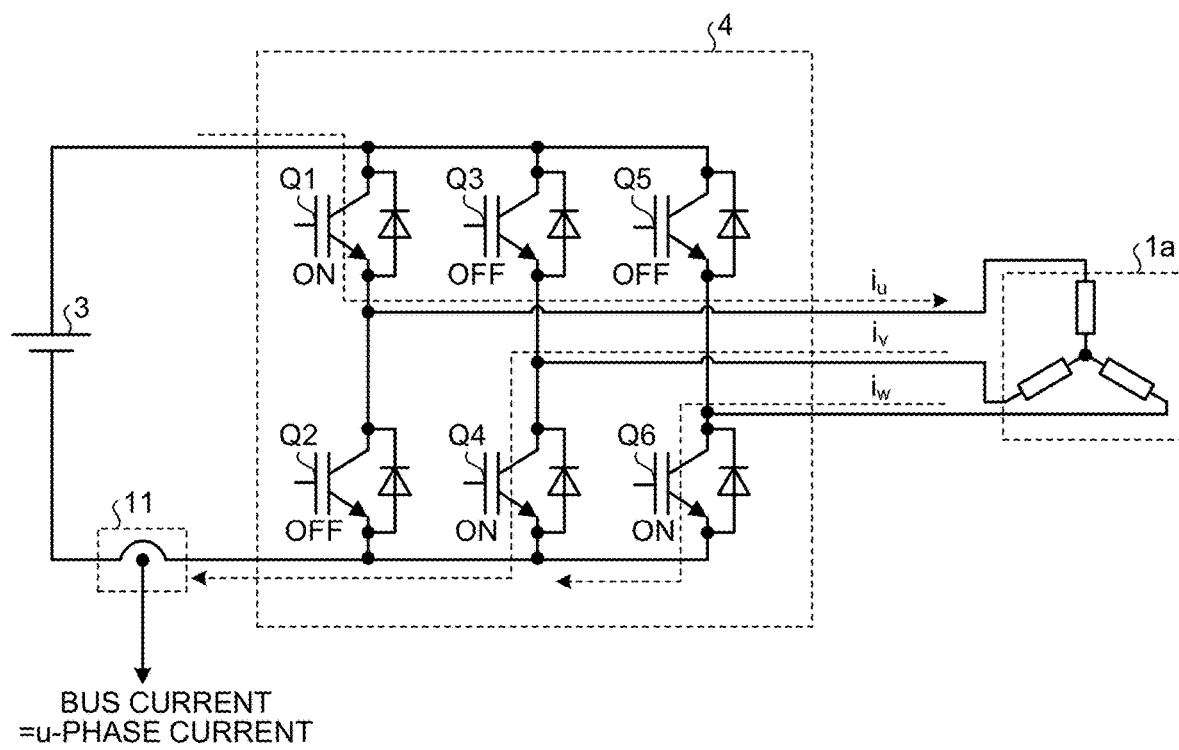
FIG. 3 is a diagram for explaining a method for determining the values of phase currents by the phase current determination unit according to the first embodiment.
Figure 4:
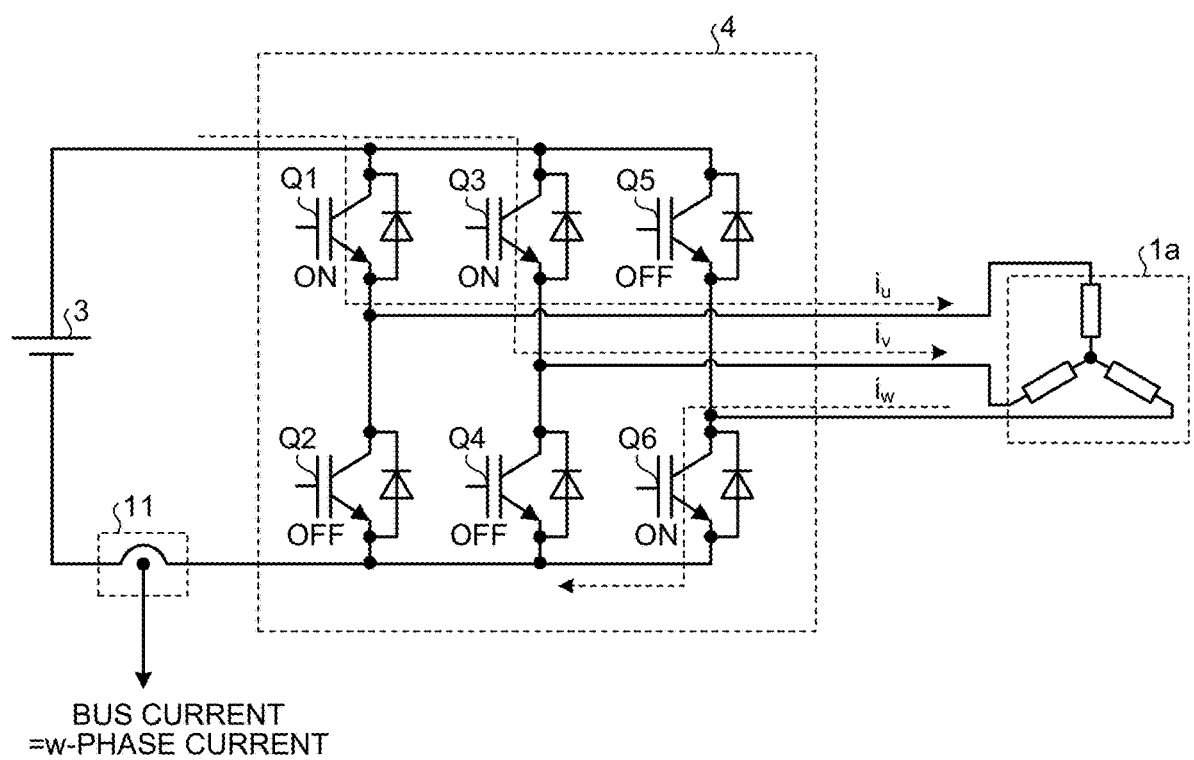
FIG. 4 is a diagram for explaining a method for determining the values of phase currents by the phase current determination unit according to the first embodiment.

FIGS. 2 to 4 are diagrams for explaining a method for determining the values of phase currents by the phase current determination unit according to the first embodiment. In the examples illustrated in FIGS. 2 to 4, the voltage-source inverter 4 is connected to a Y-connected three-phase resistive load 1a. The current flowing from the point of connection between the switching elements Q1 and Q2 to the three-phase resistive load 1a is the u-phase current $i_u$, and the current flowing from the point of connection between the switching elements Q3 and Q4 to the three-phase resistive load 1a is the v-phase current $i_v$. The current flowing from the point of connection between the switching elements Q5 and Q6 to the three-phase resistive load 1a is the w-phase current $i_w$.

The direction of the phase currents flowing from the voltage-source inverter 4 to the three-phase resistive load 1a is the positive direction, and the direction of the phase currents flowing from the three-phase resistive load 1a to the voltage-source inverter 4 is the negative direction. For example, when the u-phase current $i_u$ flows in the direction of the arrow illustrated in FIG. 2, the direction of the u-phase current $i_u$ is the positive direction. Similarly, when the v-phase current $i_v$ flows in the direction of the arrow illustrated in FIG. 2, the direction of the v-phase current $i_v$ is the positive direction, and when the w-phase current $i_w$ flows in the direction of the arrow illustrated in FIG. 2, the direction of the w-phase current $i_w$ is the positive direction.

The phase current determination unit 12 determines the values of the phase currents $i_u$, $i_v$, and $i_w$ on the basis of the value of the bus current $i_{bus}$ detected by the bus current detection unit 11 and the states of the plurality of gate pulse signals $G_u$, $G_v$, and $G_w$. For example, the phase current determination unit 12 determines the values of the phase currents $i_u$, $i_v$, and $i_w$ on the basis of the value of the bus current $i_{bus}$ detected by the bus current detection unit 11 at the timing of a specific combination pattern of the on and off states of the six switching elements Q.

For example, suppose that the switching elements Q1, Q4, and Q6 are in the on states and the switching elements Q2, Q3, and Q5 are in the off states. In this case, as illustrated in FIG. 3, the u-phase current $i_u$ flows from the voltage-source inverter 4 to the three-phase resistive load 1a, and a current having the same magnitude as the u-phase current $i^u$ is divided into the v-phase current $i_v$ and the w-phase current $i_w$ which flow from the three-phase resistive load 1a to the voltage-source inverter 4. The current flowing through the DC bus 61 has the same magnitude as the u-phase current $i_u$; therefore, the phase current determination unit 12 can determine the value of the u-phase current $i^u$ from the value of the bus current $i_{bus}$ detected by the bus current detection unit 11 in the state illustrated in FIG. 3.

As illustrated in FIG. 3, the direction of the current flowing through the DC bus 61 is opposite to the direction of the u-phase current $i_u$. The bus current detection unit 11 is located on the DC bus 61 so as to output the positive bus current $i_{bus}$ when the current flowing through the DC bus 61 is in the direction illustrated in FIG. 3. Alternatively, the bus current detection unit 11 may be located on the DC bus 61 so as to output the negative bus current $i_{bus}$ when the current flowing through the DC bus 61 is in the direction illustrated in FIG. 3. In this case, the polarity of the value of the bus current $i_{bus}$ is inverted by the phase current determination unit 12.

Although FIG. 3 depicts an example in which the value of the u-phase current $i_u$ in the positive direction is determined, the value of the u-phase current $i_u$ in the negative direction, the values of the v-phase current $i_v$ in the positive and negative directions, and the values of the w-phase current $i_w$ in the positive and negative directions are also determined similarly. For example, suppose that the switching elements Q1, Q3, and Q6 are in the on states and the switching elements Q2, Q4, and Q5 are in the off states as illustrated in FIG. 4. In this case, the phase current determination unit 12 can determine the value of the w-phase current $i_w$ in the negative direction from the value of the bus current $i_{bus}$ detected by the bus current detection unit 11.

If the values of two out of the three phase currents $i_u$, $i_v$, and $i_w$ are known, the value of the remaining one phase current can be calculated in accordance with Kirchhoff's current law. The phase current determination unit 12 therefore determines the values of any two of the three phase currents $i_u$, $i_v$, and $i_w$ from the values of the bus current $i_{bus}$ detected at two different timings by the bus current detection unit 11. Then, the phase current determination unit 12 determines the value of the remaining one phase current through calculation from the determined values of the two phase currents. In this manner, the phase current determination unit 12 determines the values of the three phase currents $i_u$, $i_v$, and $i_w$ through a set of two detections of bus currents.

In the case where the voltage-source inverter 4 is a two-level inverter, the six switching elements Q have eight patterns of a combination of on and off states. Six out of these eight combination patterns are each the specific pattern as described above. When the six switching elements Q are in the specific combination pattern of the on and off states, one of the values of the phase currents $i_u$, $i_v$, and $i_w$ can be determined from the value of the bus current $i_{bus}$ detected by the bus current detection unit 11. As the remaining two combination patterns allow the voltage-source inverter 4 to output the above-described zero-voltage vectors, it is difficult to determine the values of the phase currents $i_u$, $i_v$, and $i_w$ from the value of the bus current $i_{bus}$ detected by the bus current detection unit 11.

Figure 5:
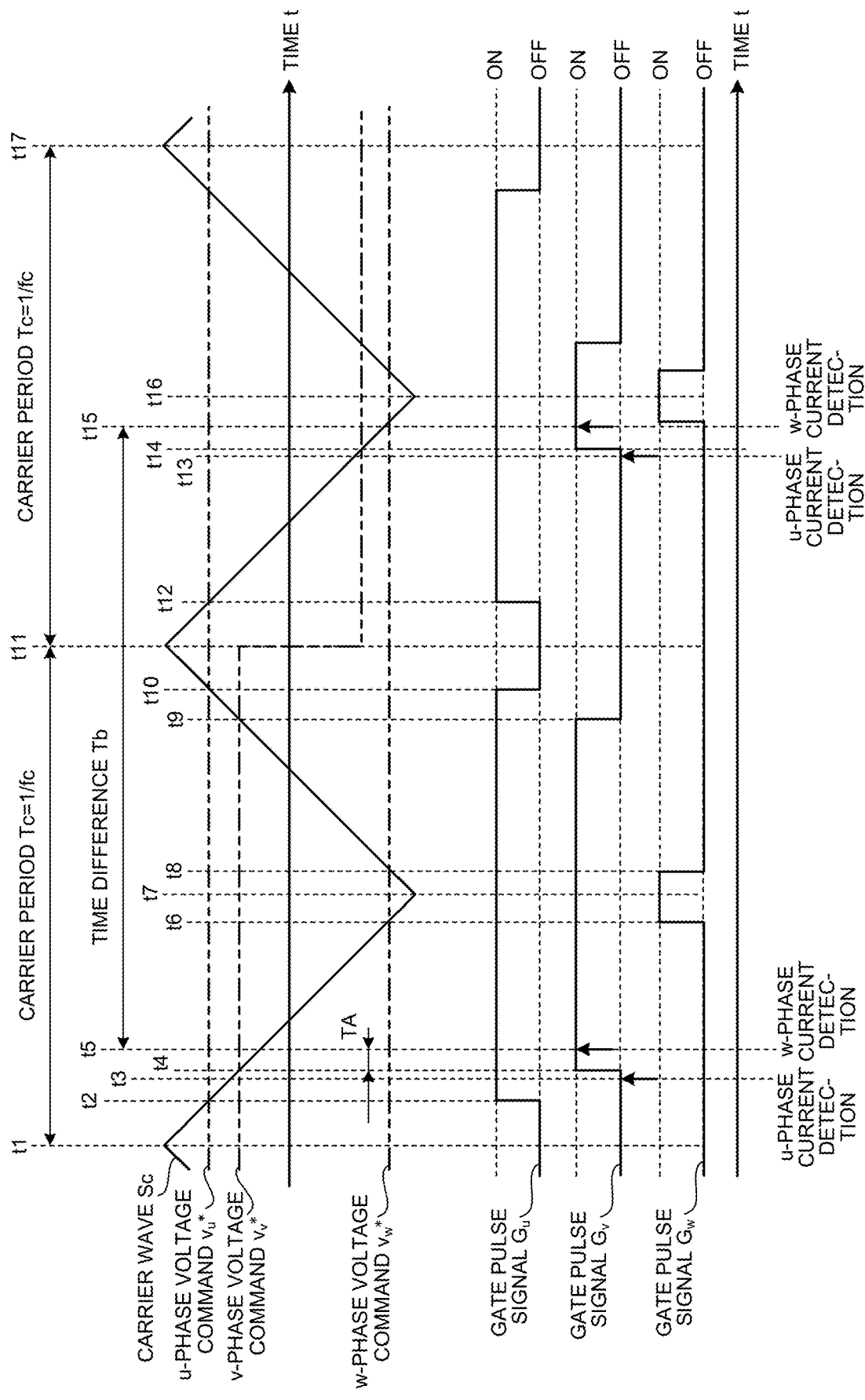
FIG. 5 is a diagram illustrating an exemplary relationship between timings of detection of the bus current for use in phase current determination by the phase current determination unit, the carrier wave, the voltage commands, and the gate pulse signals, according to the first embodiment.

FIG. 5 is a diagram illustrating an exemplary relationship between timings of detection of the bus current for use in phase current determination by the phase current determination unit, the carrier wave, the voltage commands, and the gate pulse signals, according to the first embodiment. In FIG. 5, Tc represents a carrier period, i.e. the period of the carrier wave Sc, and fc represents the carrier frequency, i.e. the frequency of the carrier wave Sc.

In the example illustrated in FIG. 5, among the three-phase voltage commands $v_u^*$, $v_v^*$, and $v_w^*$, the voltage command $v_u^*$ has the largest instantaneous value, the voltage command $v_v^*$ has the second largest instantaneous value, and the voltage command $v_w^*$ has the smallest instantaneous value. In the present embodiment, the phase of the voltage command whose absolute value is intermediate among the three-phase voltage commands $v_u^*$, $v_v^*$, and $v_w^*$ at a certain point in time is referred to as the intermediate phase. In the example illustrated in FIG. 5, in which the voltage command $v_v^*$ has an intermediate magnitude, the intermediate phase is the V phase.

In FIG. 5, the length of time from time t1 to time t7 is the first falling half period of the carrier wave Sc. A falling half period is a half period of the carrier wave Sc, during which period the value of the carrier wave Sc gradually decreases. The first falling half period of the carrier wave Sc includes time t3 when the gate pulse signal $G_u$ is in the on state and the gate pulse signals $G_v$ and $G_w$ are in the off states. At time t3, the switching elements Q1, Q4, and Q6 are in the on states and the switching elements Q2, Q3, and Q5 are in the off states. At time t3, therefore, the value of the bus current $i_{bus}$ detected by the bus current detection unit 11 is the same as the value of the u-phase current $i_u$. The phase current determination unit 12 identifies the value of the bus current $i_{bus}$ detected by the bus current detection unit 11 at time t3, as the value of the u-phase current $i_u$.

The first falling half period of the carrier wave Sc includes time t5 when the gate pulse signals $G_u$ and $G_v$ are in the on states and the gate pulse signal $G_w$ is in the off state. At time t5, the switching elements Q1, Q3, and Q6 are in the on states and the switching elements Q2, Q4, and Q5 are in the off states. At time t5, therefore, the value of the bus current $i_{bus}$ detected by the bus current detection unit 11 is the same as the value of the w-phase current $i_w$. The phase current determination unit 12 identifies the value of the bus current $i_{bus}$ detected by the bus current detection unit 11 at time t5, as the value of the w-phase current $i_w$.

The phase current determination unit 12 calculates the value of the v-phase current $i_v$ on the basis of Kirchhoff's law from the value of the u-phase current $i_u$ obtained from the value of the bus current $i_{bus}$ detected at time t3 and the value of the w-phase current $i_w$ obtained from the value of the bus current $i_{bus}$ detected at time t5. The phase current determination unit 12 thus determines the values of the phase currents $i_u$, $i_v$, and $i_w$ from the values of the bus current $i_{bus}$ detected by the bus current detection unit 11 at a plurality of current detection timings in the falling half period of the carrier wave Sc. Similarly, the phase current determination unit 12 determines the values of the phase currents $i_u$, $i_v$, and $i_w$ using the values of the bus current $i_{bus}$ detected by the bus current detection unit 11 at current detection timings, i.e., times t13 and t15 in the next falling half period from times t11 to t16.

The phase current determination unit 12 thus determines the values of the phase currents $i_u$, $i_v$, and $i_w$ from the values of the bus current $i_{bus}$ detected by the bus current detection unit 11 at two current detection timings in a falling half period of the carrier wave Sc. Note that these two current detection timings are not necessarily in a falling half period of the carrier wave Sc. For example, instead of a falling half period of the carrier wave Sc, the phase current determination unit 12 can use a rising half period of the carrier wave Sc to determine the values of the phase currents $i_u$, $i_v$, and $i_w$ from the values of the bus current $i_{bus}$ detected by the bus current detection unit 11 at two current detection timings. A rising half period is a half period of the carrier wave Sc, during which period the value of the carrier wave Sc gradually increases.

Immediately after the switching elements Q switch between the on state and the off state, ringing occurs in the bus current $i_{bus}$ due to such switching of the switching elements Q between the on state and the off state. It is difficult to accurately determine the values of the phase currents $i_u$, $i_v$, and $i_w$ from the value of the ringing bus current $i_{bus}$. For this reason, the phase current determination unit 12 waits for a predetermined period of time until the ringing ceases, and thereafter determines the values of the phase currents, using the value of the bus current $i_{bus}$ detected by the bus current detection unit 11.

In the example illustrated in FIG. 5, the phase current determination unit 12 identifies, as the value of the phase current $i_u$, the value of the bus current $i_{bus}$ detected by the bus current detection unit 11 at time t3, which is immediately before time t4 when the gate pulse signal $G_v$ which is the gate pulse signal of the intermediate phase switches from the off state to the on state. In addition, the phase current determination unit 12 identifies, as the value of the phase current $i_w$, the value of the bus current $i_{bus}$ detected by the bus current detection unit 11 at time t5, which is after a preset period of time TA from time t4 when the gate pulse signal $G_v$ switches from the off state to the on state.

The phase current determination unit 12 thus determines a state switching timing at which the gate pulse signal of the intermediate phase among the gate pulse signals $G_u$, $G_v$, and $G_w$ switches between the on state and the off state. Then, the phase current determination unit 12 designates each of the timing immediately before the state switching timing and the timing after the period of time TA from the state switching timing, as a bus current detection timing at which the value of the bus current $i_{bus}$ is detected. The phase current determination unit 12 determines the values of any two of the phase currents $i_u$, $i_v$, and $i_w$ from the values of the bus current $i_{bus}$ detected by the bus current detection unit 11 at these two bus current detection timings. The phase current determination unit 12 calculates the value of the remaining phase current on the basis of the determined values of the two phase currents. Advantageously, the determination timings of the two phase currents are close to each other, enabling the phase current determination unit 12 to accurately determine the value of the remaining phase current on the basis of the detected values of the two phase currents.

The phase current determination unit 12 can store the values of the bus current $i_{bus}$ repeatedly detected by the bus current detection unit 11. From the stored values of the bus current $i_{bus}$, the phase current determination unit 12 can extract the value of the bus current $i_{bus}$ detected by the bus current detection unit 11 immediately before the gate pulse signal of the intermediate phase switches. The phase current determination unit 12 can determine the value of the phase current based on the extracted value of the bus current $i_{bus}$.

Assume that there is a delay time Td from when the gate pulse signal of the intermediate phase switches from the off state to the on state, to when the upper arm of the leg of the intermediate phase switches from the off state to the on state. In this case, the phase current determination unit 12 can also use the value of the bus current $i_{bus}$ detected by the bus current detection unit 11 at the time when the gate pulse signal of the intermediate phase switches between the on state and the off state. In addition to the value of the bus current $i_{bus}$ detected at the time when the gate pulse signal of the intermediate phase switches between the on state and the off state, the phase current determination unit 12 uses the value of the bus current $i_{bus}$ detected a period of time TC after the gate pulse signal of the intermediate phase switches between the on state and the off state. The period of time TC is the period of time TA plus the delay time Td. In the above-described example, the intermediate phase is the v phase. However, the intermediate phase may also be the u phase or the w phase, in which case the phase current determination unit 12 can perform similar processing.

As described above, the phase current determination unit 12 determines two bus current detection timings on the basis of the timing at which the gate pulse signal of the intermediate phase among the plurality of gate pulse signals $G_u$, $G_v$, and $G_w$ changes. These two bus current detection timings are timings at which to detect the values of the bus current $i_{bus}$ for use in determining the values of two of the phase currents $i_u$, $i_v$, and $i_w$. The phase current determination unit 12 determines the values of the phase currents $i_u$, $i_v$, and $i_w$ on the basis of the plurality of values of the bus current $i_{bus}$ detected by the bus current detection unit 11 every detection time including the determined two bus current detection timings.

Changes in the voltage commands $v_u^*$, $v_v^*$, and $v_w^*$ switches the pattern of the combination of the on state and the off state between the above-described eight patterns. The changes in the voltage commands $v_u^*$, $v_v^*$, and $v_w^*$ changes the interval at which to switch the combination pattern. The combination pattern is switched by switching of any of the three-phase gate pulse signals $G_u$, $G_v$, and $G_w$ between the on state and the off state, immediately after which ringing occurs in the bus current $i_{bus}$.

The ringing typically converges on the order of several microseconds, but if any of the three-phase gate pulse signals $G_u$, $G_v$, and $G_w$ switches between the on state and the off state again before the ringing converges, it is difficult to obtain the pre-switching values of the phase currents. That is, if the state of the gate pulse signal group made up of the three-phase gate pulse signals $G_u$, $G_v$, and $G_w$ changes twice in the range of several microseconds, it is difficult to determine the values of the phase currents from the value of the bus current $i_{bus}$ detected by the bus current detection unit 11. Thus, if the interval at which to switch the combination pattern is shorter than the ringing convergence time, it is difficult to determine the values of the phase currents from the value of the bus current $i_{bus}$ detected by the bus current detection unit 11.

In view of this, the pulse shift processing unit 22 of the control device 5 performs a process for shifting the timing at which to switch at least one of the three-phase gate pulse signals $G_u$, $G_v$, and $G_w$ between the on state and the off state such that the interval at which to switch the combination pattern is longer than or equal to the preset length of time TA. The length of time TA is set to a value longer than or equal to a ringing convergence time that is the length of time from the occurrence of ringing to convergence of ringing. Consequently, the pulse shift processing unit 22 can shift the interval at which to switch between the combination pattern by the ringing convergence time or more, and can secure the latency to the convergence of ringing regardless of the values of the voltage commands $v_u^*$, $v_v^*$, and $v_w^*$.

The pulse shift processing unit 22 performs the pulse shift processing for shifting the timing at which at least one of the three-phase gate pulse signals $G_u$, $G_v$, and $G_w$ switches between the on state and the off state within one carrier period. For example, the pulse shift processing unit 22 performs a process for shifting the gate pulse signal G in the length of time made up of the rising-half and falling-half periods of the carrier wave Sc so that the rising half cycle and the falling half cycle, of the carrier wave Sc have different duty ratios of the gate pulse signal G.

Although the pulse shift processing changes the three-phase voltages output from the voltage-source inverter 4 in a half period of the carrier wave Sc, the duty ratio of the gate pulse signal G in one carrier period is the same before and after shifting the timing of switching between the on state and the off state. Consequently, the switching elements Q1, Q2, Q3, Q4, Q5, and Q6 are turned on and off such that the average of the three-phase voltages output from the voltage-source inverter 4 for each carrier period matches the voltage commands $v_u^*$, $v_v^*$, and $v_w^*$. The pulse shift processing unit 22 can therefore prevent a change in the output three-phase voltages of the voltage-source inverter 4 on a carrier-period-by-carrier-period basis.

The pulse shift processing enables the phase current determination unit 12 to determine the values of the phase currents $i_u$, $i_v$, and $i_w$ from the values of the bus current $i_{bus}$ detected by the bus current detection unit 11 regardless of the values of the voltage commands $v_u^*$, $v_v^*$, and $v_w^*$.

In the example illustrated in FIG. 5, the phase current determination unit 12 determines the values of the three phase currents $i_u$, $i_v$, and $i_w$ in a falling half period of the carrier wave Sc, but the timings at which to determine the values of the three phase currents $i_u$, $i_v$, and $i_w$ are not necessarily in a falling half period of the carrier wave Sc. For example, instead of a falling half period of the carrier wave Sc, the phase current determination unit 12 can use a rising half period of the carrier wave Sc to determine the values of the phase currents $i_u$, $i_v$, and $i_w$ on the basis of the values of the bus current $i_{bus}$ detected by the bus current detection unit 11 at two bus current detection timings.

In addition, the phase current determination unit 12 can alternately perform the determination process for determining the values of the phase currents $i_u$, $i_v$, and $i_w$ in a falling half period of the carrier wave Sc and the determination process for determining the values of the phase currents $i_u$, $i_v$, and $i_w$ in a rising half period of the carrier wave Sc. In this case, the phase current determination unit 12 determines the values of the phase currents $i_u$, $i_v$, and $i_w$ once every 1.5 times or more a period of the carrier wave Sc because the pulse shift processing unit 22 prevents a change in the output voltages of the voltage-source inverter 4 on a carrier-period-by-carrier-period basis.

In addition, instead of determining the values of the three phase currents $i_u$, $i_v$, and $i_w$ in every period of the carrier wave Sc, the phase current determination unit 12 can determine the values of the three phase currents $i_u$, $i_v$, and $i_w$ in every two or more periods of the carrier wave Sc. In a case where there is an upper limit on the frequency of the carrier wave Sc, the longer three-phase current determination period, which is the period of the determination process for determining the values of the three phase currents $i_u$, $i_v$, and $i_w$ results in the frequencies of the phase currents $i_u$, $i_v$, and $i_w$ approaching the frequency of the carrier wave Sc during high-speed rotation of the AC motor 1. In this case, the time resolution relative to the one-period waveforms of the phase currents $i_u$, $i_v$, and $i_w$ determined by the phase current determination unit 12 is lowered. The lower the time resolution, the lower the estimation accuracy of the estimation device 9 and the control performance by the control device 5. It is therefore preferable that the three-phase current determination period be not long during high-speed rotation. In the presence of the upper limit on the frequency of the carrier wave Sc, therefore, it may be desirable that the three-phase current determination period be one period of the carrier wave Sc.

The above-described state switching timing of the gate pulse signal of the intermediate phase changes in accordance with the voltage command of the intermediate phase. The bus current detection timings at which the values of the bus current $i_{bus}$ are detected change in accordance with the state switching timing of the gate pulse signal of the intermediate phase. The bus current detection timings also change due to the pulse shift processing by the pulse shift processing unit 22. The change of the bus current detection timings due to the pulse shift processing is small, but when the voltage command of the intermediate phase greatly fluctuates, the bus current detection timings also greatly fluctuate.

In the example illustrated in FIG. 5, the value of the v-phase voltage command $v_v*$, which is the voltage command of the intermediate phase, greatly changes at time t11 when the carrier wave Sc reaches the maximum value. As a result, the switching timing of the gate pulse signal $G_v$, which is the gate pulse signal of the intermediate phase, also greatly varies. Accordingly, there is a large difference between the length of time from time t1 when the carrier wave Sc reaches the maximum value to times t3 and t5, and the length of time from time t11 when the carrier wave Sc reaches the maximum value to times t13 and t15. Times t3 and t5 are bus current detection timings. Times t13 and t15 are bus current detection timings.

As discussed above, the bus current detection timings vary from carrier period to carrier period. In view of this, the estimation unit 15 uses the time difference Tb between current detection times in estimating the magnetic pole position $\theta_e$ and the rotational speed $\omega_e$, using the values of the phase currents $i_u$, $i_v$, and $i_w$ determined by the phase current determination unit 12. A current detection time is a time identified as the detection time at which the bus current detection unit 11 detects the bus current $i_{bus}$ for use in a determination process by the phase current determination unit 12. For example, the current detection time is an average time of the detection time of the bus current $i_{bus}$ used by the phase current determination unit 12 to determine the value of the current of a first phase and the detection time of the bus current $i_{bus}$ used by the phase current determination unit 12 to determine the value of the current of a second phase. In this case, the phase current determination unit 12 calculates the current detection time by adding the detection time of the bus current $i_{bus}$ used to determine the value of the current of the first phase and the detection time of the bus current $i_{bus}$ used to determine the value of the current of the second phase and dividing the resultant value by two. The detection time of the bus current $i_{bus}$ is the time when the bus current $i_{bus}$ is detected by the bus current detection unit 11.

Note that the current detection time may be the detection time at which by the bus current detection unit 11 detects the bus current $i_{bus}$ used to determine the value of the current of the first phase. Alternatively, the current detection time may be the detection time at which the bus current detection unit 11 detects the bus current $i_{bus}$ used to determine the value of the current of the second phase.

For example, in FIG. 5, let tu1 represent time t3 when the bus current $i_{bus}$ is detected for use in the initial determination of the value of the u-phase current $i_u$, and let tu2 represent time t13 when the bus current $i_{bus}$ is detected for use in the next determination of the value of the u-phase current $i_u$. In addition, let tw1 represent time t5 when the bus current $i_{bus}$ is detected for use in the initial determination of the value of the w-phase current $i_w$, and let tw2 represent time t15 when the bus current $i_{bus}$ is detected for the next determination of the value of the w-phase current $i_w$. The period of time TA, which is the latency for ringing convergence, is known. Thus, the time difference between time tu1 and time tw1 is known, and the time difference between time tu2 and time tw2 is also known. However, the time difference between time tu1 and time tu2 or the time difference between time tw1 and time tw2 is not known. In other words, the time difference Tb between current detection times is not known.

In view of this, the time difference calculation unit 13 calculates the time difference Tb between current detection times on the basis of the gate pulse signals $G_u$, $G_v$, and $G_w$. Specifically, the time difference calculation unit 13 determines times tu1, tw1, tu2, and tw2 on the basis of the timings at which the gate pulse signal of the intermediate phase among the gate pulse signals $G_u$, $G_v$, and $G_w$ switches between the on state and the off state. On the basis of the determined times tu1, tw1, tu2, and tw2, the time difference calculation unit 13 calculates time tavg1 that is the intermediate time between time tu1 and time tw1, and calculates time tavg2 that is the intermediate time between time tu2 and time tw2. The time difference calculation unit 13 calculates the time difference between time tavg1 and time tavg2, as the time difference Tb. The time difference calculation unit 13 thus calculates the time difference Tb between the current detection time identified as the detection time of the bus current $i_{bus}$ used in a determination process by the phase current determination unit 12 and the current detection time identified as the detection time of the bus current $i_{bus}$ used in the next determination process by the phase current determination unit 12.

If the period of time TA, which is the latency for ringing convergence, is constant, each of the time difference between time tu1 and time tu2 and the time difference between time tw1 and time tw2 is the same as the time difference between time tavg1 and time tavg2. In this case, the time difference calculation unit 13 can calculate the time difference between time tu1 and time tu2, as the time difference Tb, or can calculate the time difference between time tw1 and time tw2, as the time difference Tb. FIG. 5 depicts an example in which the time difference between time tw1 and time tw2 is calculated as the time difference Tb.

Figure 6:
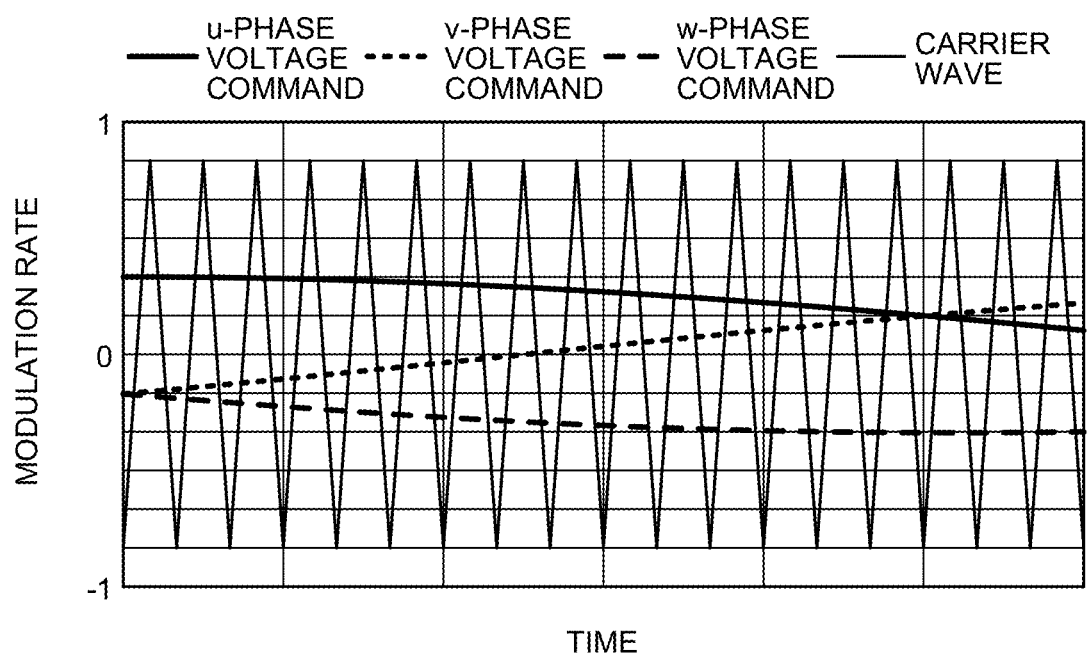
FIG. 6 is a diagram illustrating an exemplary relationship between the three-phase voltage commands and the carrier wave during the rotation of the AC motor at low speed, according to the first embodiment.
Figure 7:
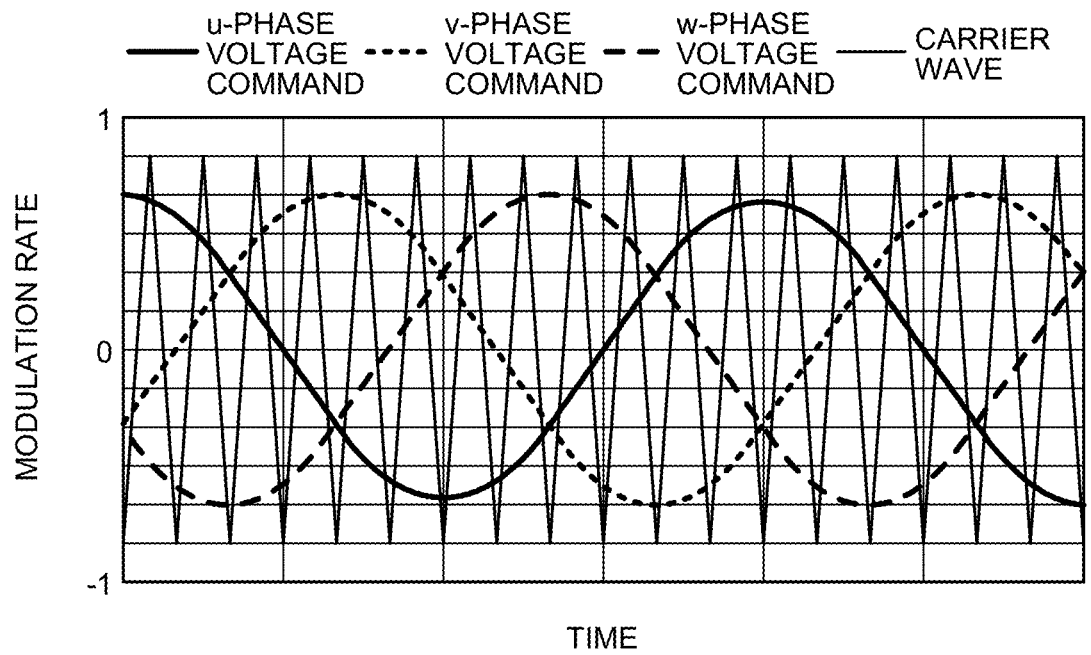
FIG. 7 is a diagram illustrating an exemplary relationship between the three-phase voltage commands and the carrier wave during the rotation of the AC motor at high speed, according to the first embodiment.

The fluctuation of the time difference Tb will be described more specifically. FIG. 6 is a diagram illustrating an exemplary relationship between the three-phase voltage commands and the carrier wave during the rotation of the AC motor at low speed, according to the first embodiment. FIG. 7 is a diagram illustrating an exemplary relationship between the three-phase voltage commands and the carrier wave during the rotation of the AC motor rotates at high speed, according to the first embodiment. In FIGS. 6 and 7, the vertical axis represents modulation rate, and the horizontal axis represents time. The three-phase voltage commands $v_u^*$, $v_v^*$, and $v_w^*$ illustrated in FIGS. 6 and 7 are not subjected to zero-vector modulation by the zero-vector modulation unit 34.

As illustrated in FIG. 6, when the AC motor 1 rotates at low speed, the frequencies of the three-phase voltage commands $v_u^*$, $v_v^*$, and $v_w^*$ are sufficiently low relative to the frequency of the carrier wave Sc. In addition, because the speed electromotive force of the AC motor 1 increases in proportion to the speed of the AC motor 1, when the AC motor 1 rotates at low speed, the amplitudes of the three-phase voltage commands $v_u^*$, $v_v^*$, and $v_w^*$ are relatively small. For this reason, the three-phase voltage commands $v_u^*$, $v_v^*$, and $v_w^*$ have a gentle slope, and the voltage command of the intermediate phase has a gentle slope. Note that in the example illustrated in FIG. 6, the intermediate phase is the v phase from the first half to a part of the second half, and is the u phase in the remaining part of the second half.

As illustrated in FIG. 7, when the AC motor 1 rotates at high speed, the frequencies of the three-phase voltage commands $v_u^*$, $v_v^*$, and $v_w^*$ are higher than when the AC motor 1 rotates at low speed. For example, when the AC motor 1 is rotated by asynchronous pulse width modulation (PWM), it is not uncommon that the ratio of the frequencies of the three-phase voltage commands $v_u^*$, $v_v^*$, and $v_w^*$ to the frequency of the carrier wave Sc is about 10% to 15%. When the AC motor 1 rotates at high speed, as illustrated in FIG. 7, the intermediate phase changes at high speed in the order of the v phase, the u phase, the w phase, the v phase, . . . , and the speed electromotive force is also large, as compared with the case where the AC motor 1 rotates at low speed. For this reason, the amplitudes of the three-phase voltage commands $v_u^*$, $v_v^*$, and $v_w^*$ are also large as compared with the case illustrated in FIG. 6, and the slope of the voltage command of the intermediate phase is also significantly large. The time difference Tb between current detection times therefore fluctuates greatly.

The higher the time resolution with respect to the waveforms of the phase currents $i_u$, $i_v$, and $i_w$, the better for high-speed rotation of the AC motor 1. In the example illustrated in FIG. 5, the phase current determination unit 12 performs the process of determining the values of the three-phase currents $i_u$, $i_v$, and $i_w$ on the basis of the values of the bus current $i_{bus}$ detected by the bus current detection unit 11 in every period of the carrier wave Sc. The fluctuation of the time difference Tb between current detection times relative to the average time difference between current detection times is largest when the values of the three phase currents $i_u$, $i_v$, and $i_w$ are determined once every period of the carrier wave Sc. In this case, the time difference Tb between current detection times varies in the range of 0.5×Tbave<Tb<1.5×Tbave, where "Tbave" represents the average time difference between current detection times.

In the case where the values of the three phase currents $i_u$, $i_v$, and $i_w$ are determined once every two periods of the carrier wave Sc, the fluctuation of the time difference Tb between current detection times is mitigated to the range of 0.75×Tbave<Tb<1.25×Tbave. "Tbave" is the average time difference between current detection times as described above. The larger the average time difference between current detection times, the more mitigated the fluctuation of the time difference Tb between current detection times but the lower the time resolution relative to the waveforms of the phase currents $i_u$, $i_v$, and $i_w$. For this reason, when the AC motor 1 rotates at high speed, it may be difficult to ensure high estimation accuracy for the rotational speed $\omega_e$.

Figure 8:
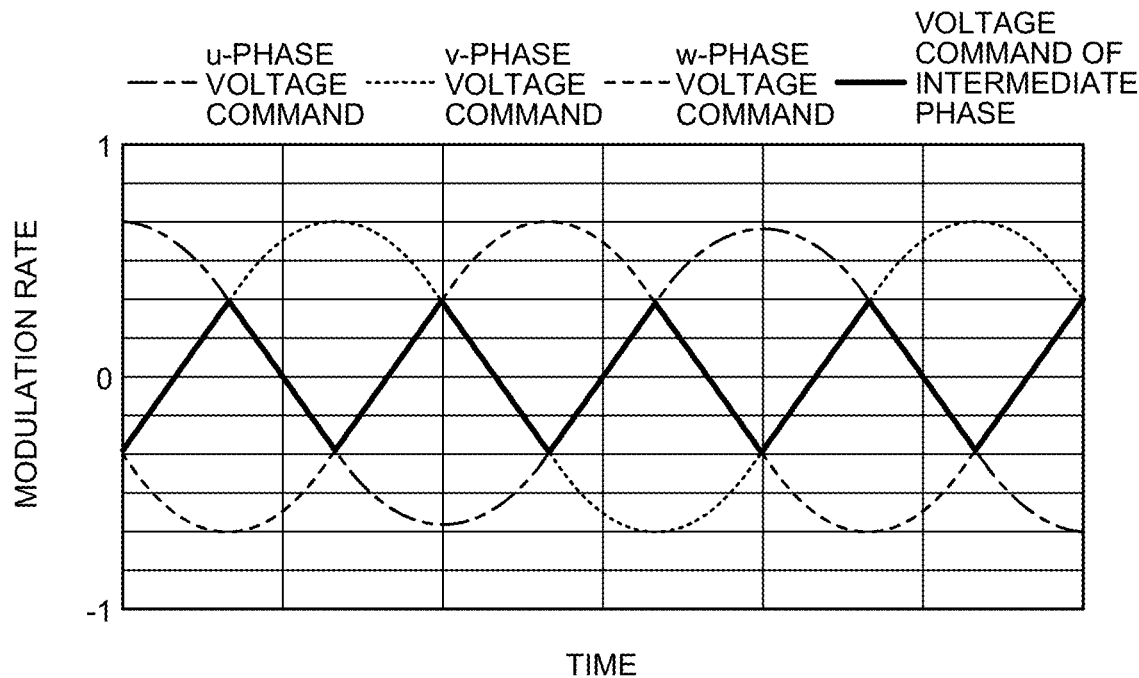
FIG. 8 is a diagram illustrating exemplary changes in the voltage command of the intermediate phase in the case where the three-phase voltage commands are sine waves, according to the first embodiment.
Figure 9:
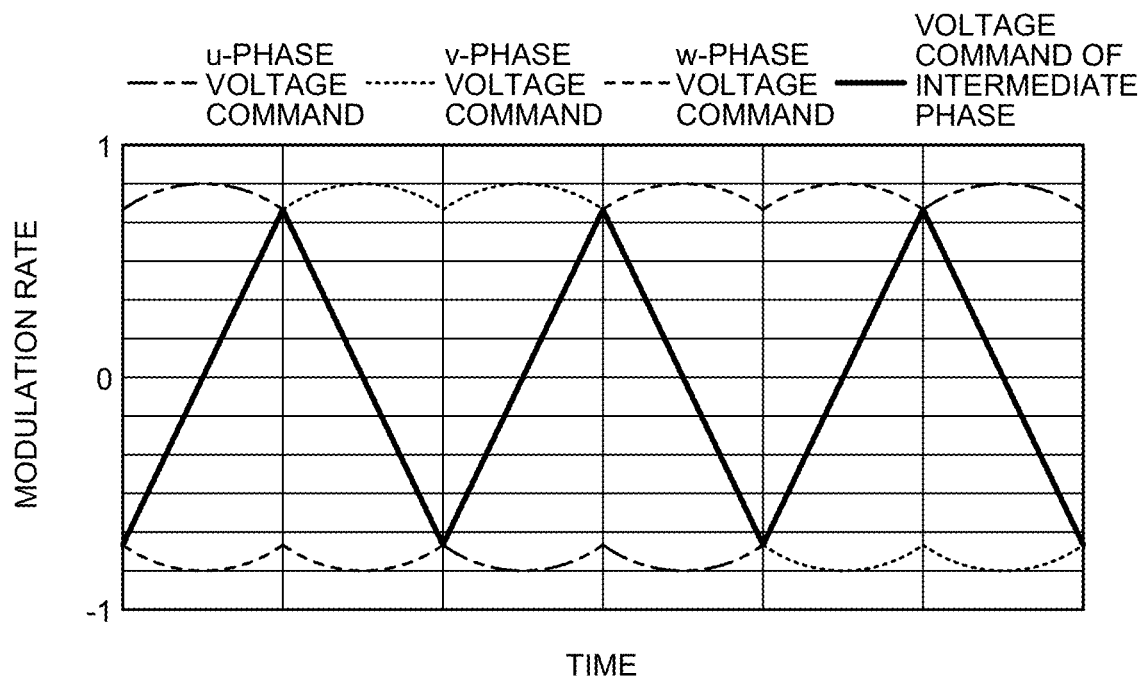
FIG. 9 is a diagram illustrating exemplary changes in the voltage command of the intermediate phase among the three-phase voltage commands modified using third harmonic superposition, according to the first embodiment.

FIG. 8 is a diagram illustrating exemplary changes in the voltage command of the intermediate phase in the case where the three-phase voltage commands are sine waves, according to the first embodiment. FIG. 9 is a diagram illustrating exemplary changes in the voltage command of the intermediate phase among the three-phase voltage commands modified using third harmonic superposition, according to the first embodiment. As illustrated in FIG. 8, when the three-phase voltage commands $v_u^*$, $v_v^*$, and $v_w^*$ are sine waves, the waveform of the voltage command of the intermediate phase is substantially triangular. As illustrated in FIG. 9, when the three-phase voltage commands $v_u^*$, $v_v^*$, and $v_w^*$ are voltage commands having the third harmonic superposed on sine waves, the waveform of the voltage command of the intermediate phase is also substantially triangular. In a case where another modulation scheme is used, the intermediate phase waveform may not be as triangular as those illustrated in FIGS. 8 and 9, but as the degree of freedom in selecting the zero-voltage vectors decreases in the vicinity of the modulation rate of one, the waveform of the intermediate phase becomes considerably closer to triangular.

The frequencies of these triangular waves are three times the three-phase voltage commands $v^{u*}$, $v_v^*$, and $v_w^*$, as illustrated in FIGS. 8 and 9. For this reason, the waveform of the intermediate phase includes a 3n-th-order frequency component relative to the fundamental frequency of the three-phase voltage commands $v_u^*$, $v_v^*$, and $v_w^*$. Numeral "n" is an odd number of one or more.

Figure 10:
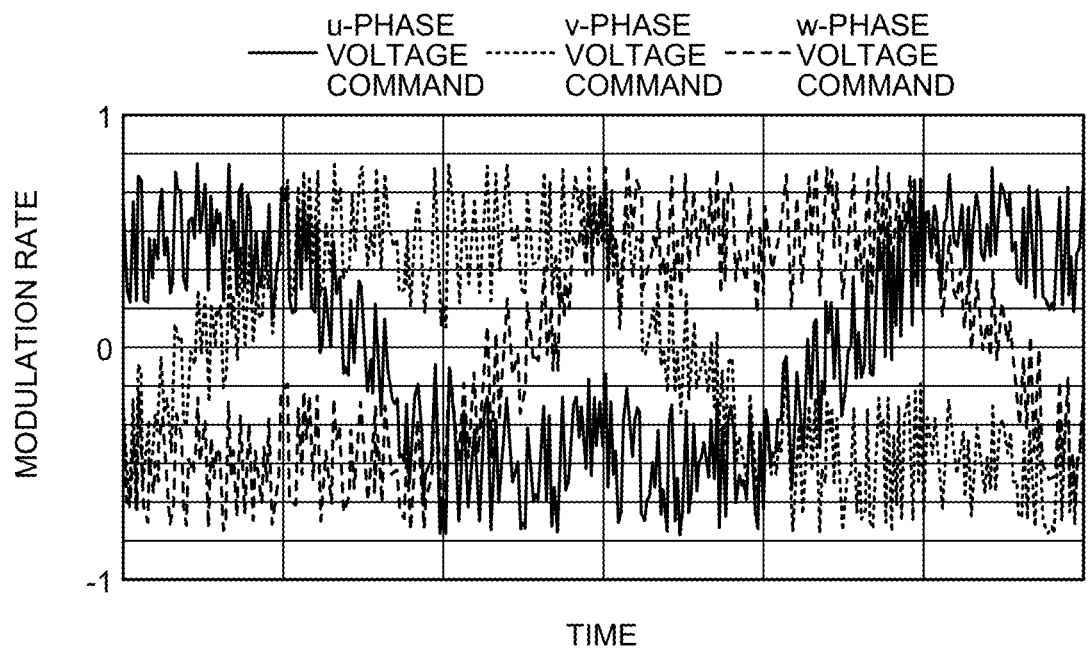
FIG. 10 is a diagram illustrating an example of the three-phase voltage commands subjected to zero-vector modulation by a zero-vector modulation unit according to the first embodiment.

The fluctuation of the time difference Tb between current detection times may be large not only when the AC motor 1 is rotated at high speed but also when the AC motor 1 is rotated at low speed. FIG. 10 is a diagram illustrating an example of the three-phase voltage commands subjected to zero-vector modulation by the zero-vector modulation unit according to the first embodiment. In FIG. 10, the vertical axis represents modulation rate, and the horizontal axis represents time. The waveforms $v_u^*$, $v_v^*$, and $v_w^*$ illustrated in FIG. 10 are like waveforms having random noise added to the third-harmonic-superposed waveforms of the voltage commands $v_u^*$, $v_v^*$, and $v_w^*$ illustrated in FIG. 9.

As described above, the spectral peak of carrier noise is dispersed through zero-vector modulation so that carrier noise can be reduced. In the case of zero-vector modulation, the waveform of the intermediate phase may change rapidly even when the AC motor 1 rotates at low speed. When the AC motor 1 rotates at low speed, the voltages output from the voltage-source inverter 4 are small, and the smaller the voltages output from the voltage-source inverter 4, the greater the degree of freedom in selecting the zero-voltage vectors. When the AC motor 1 rotates at low speed, therefore, the smaller the modulation rate of the voltage commands $v_u^*$, $v_v^*$, and $v_w^*$, the larger the random number value that can be added to the voltage commands $v_u^*$, $v_v^*$, and $v_w^*$ in zero-vector modulation. The zero-vector modulation unit 34 increases the random number value to be added to the voltage commands $v_u^*$, $v_v^*$, and $v_w^*$ as the AC motor 1 rotates at lower speeds.

In the case of zero-vector modulation, therefore, the waveform of the voltage command of the intermediate phase rapidly changes even when the AC motor 1 rotates at low speed, resulting in a large change in the time difference Tb between current detection times. In this case, if the fluctuation of the time difference Tb between current detection times is ignored, speed estimation or position estimation may not produce a good result.

Figure 11:
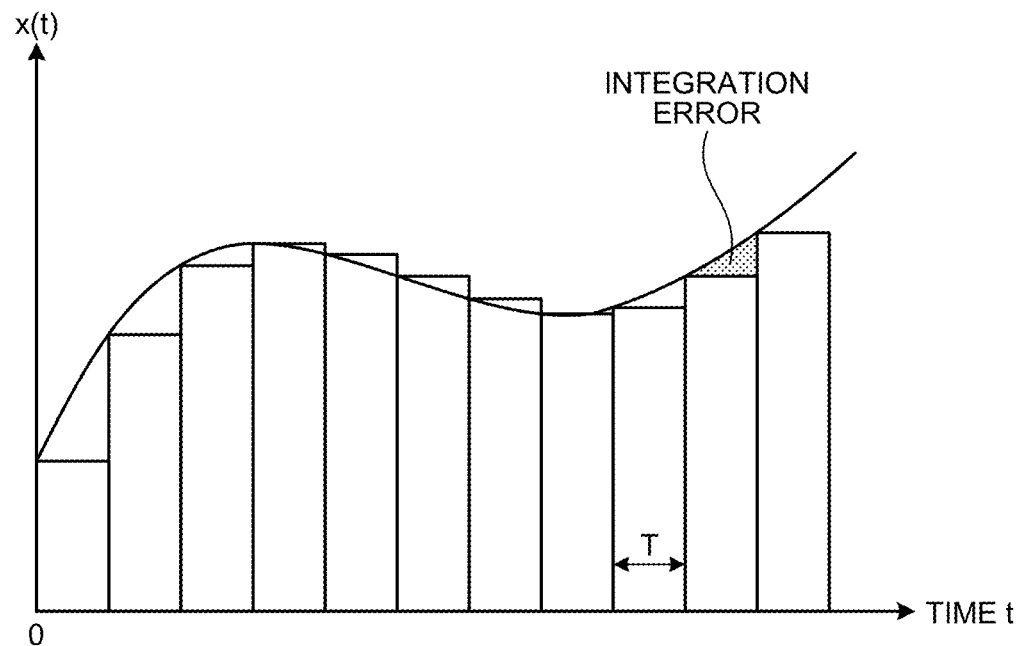
FIG. 11 is a diagram schematically illustrating integration on the basis of rectangular approximation.
Figure 12:
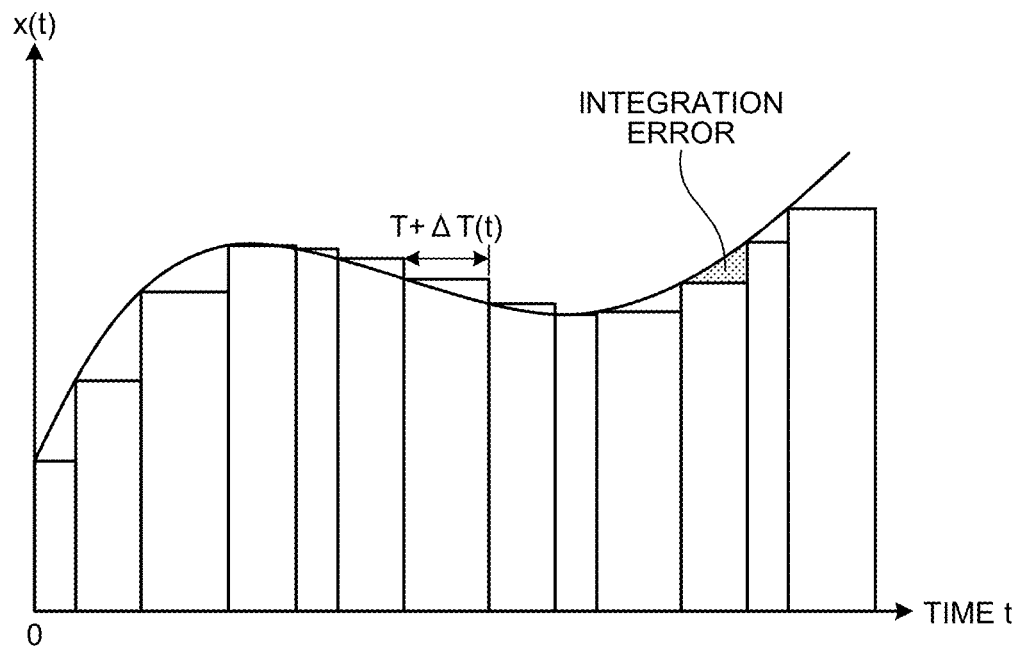
FIG. 12 is a diagram schematically illustrating integration on the basis of rectangular approximation.
Figure 13:
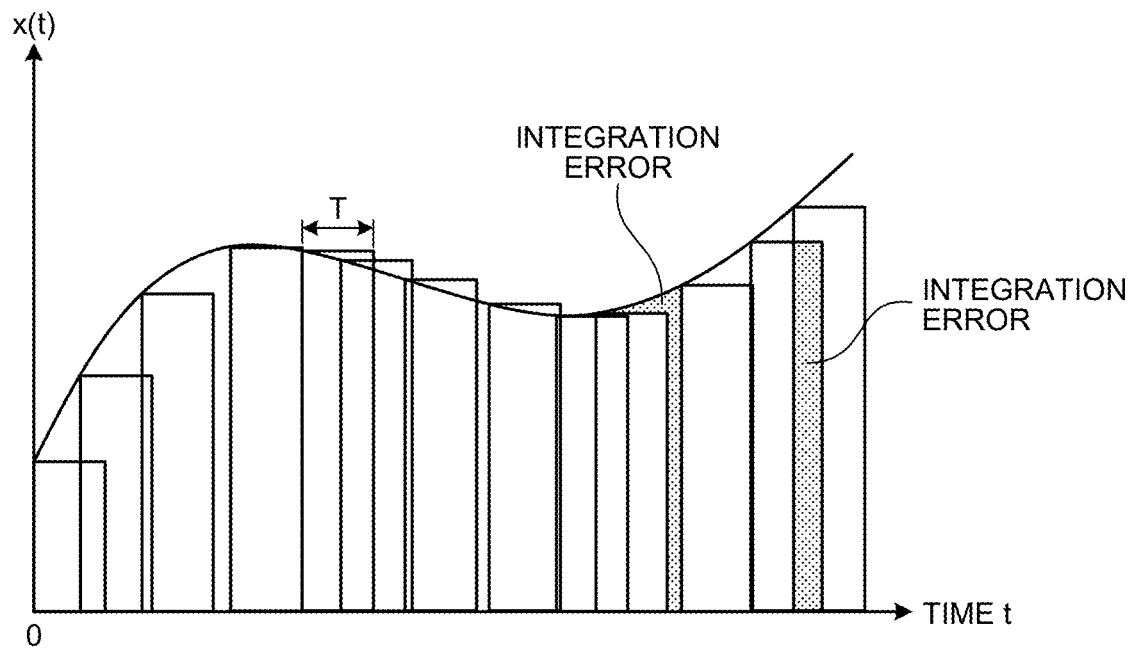
FIG. 13 is a diagram schematically illustrating integration in which fluctuations in time difference are ignored.

Errors in differentiation and integration associated with changes in the time difference Tb between current detection times will be described. First, errors in integration associated with changes in the time difference Tb between current detection times will be described. FIGS. 11 and 12 are diagrams schematically illustrating integration on the basis of rectangular approximation. FIG. 13 is a diagram schematically illustrating integration in which fluctuations in time difference are ignored. In FIGS. 11 to 13, the vertical axis represents the value of a curve x(t) at time t, and the horizontal axis represents time.

When the curve x(t) is discretely integrated, the integration result is obtained by placing a plurality of rectangles each having a width of a minute time T in the width direction, and adding up the areas of the rectangles. In this case, the rectangles are placed such that the rectangles do not overlap one another each other and adjacent ones of the rectangles do not form a gap therebetween. FIG. 11 depicts an example of integration based on rectangular approximation in which the minute time T is constant, which produces an error in integration; however, integration based on rectangular approximation has no problem in many cases. For more accurate integration, integration based on trapezoidal approximation can be used.

In a case where the minute time T is not constant as illustrated in FIG. 12, similarly, appropriate integration can be performed by placing rectangles such that the rectangles do not overlap one another and adjacent ones of the rectangles do not form a gap therebetween. In the example illustrated in FIG. 12, $T=T+\Delta T(t)$ holds true, where the minute time T is constant and $\Delta T(t)$ is a time that fluctuates with the lapse of time.

If integration is performed without using $\Delta T(t)$, as illustrated in FIG. 13, rectangles overlap one another or adjacent ones of the rectangles form a gap therebetween. As for the entire area, overlaps and gaps may cancel each other so that a large error does not occur, but a large error does occur in a partial area. If integration is performed with the time difference Tb between current detection times being a fixed value, therefore, an error occurs in the result of the integration.

Figure 14:
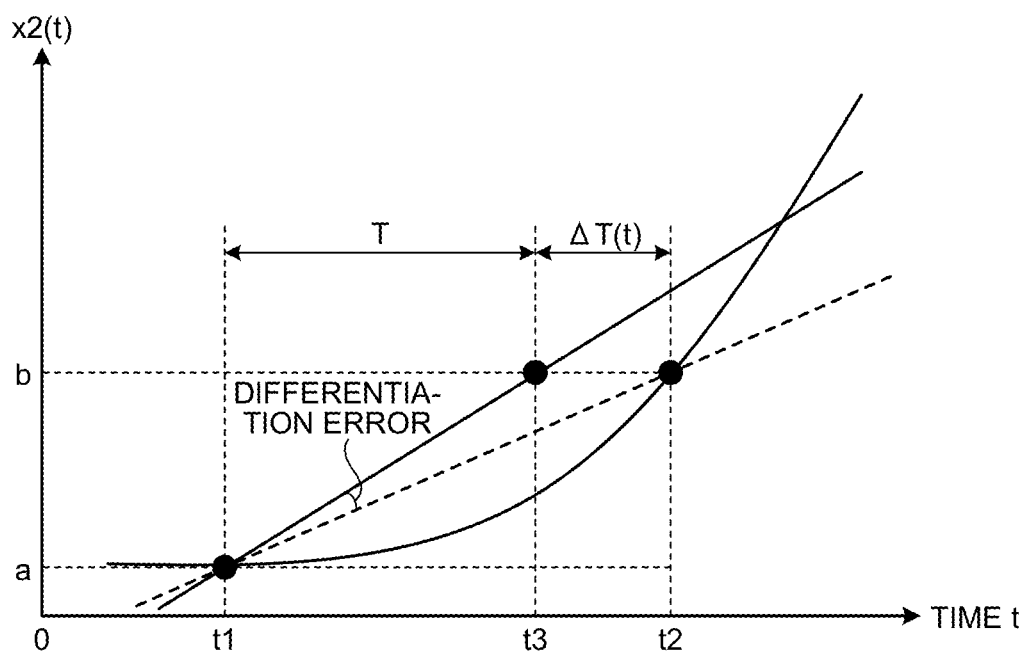
FIG. 14 is a diagram for explaining an error in differentiation.

Next, errors in differentiation associated with changes in the time difference Tb between current detection times will be described. FIG. 14 is a diagram for explaining an error in differentiation. In the example illustrated in FIG. 14, assume that values that can be used to obtain the slope of a curve $x2(t)$ are two points: $x2(t1)=a$ at time t1 and $x2(t2)=b$ at time t2, and the time difference Tb between time t1 and time t2 is $Tb=T+\Delta T(t)$. Assume that $\Delta T(t)$, which is the amount of fluctuation in the time difference Tb, varies by calculation timing. In this case, if differentiation is performed without using $\Delta T(t)$, an error equivalent to $\Delta T(t)$ occurs in the result of the differentiation.

When the time difference Tb between current detection times fluctuates, and differentiation and integration are performed ignoring that fluctuation of the time difference Tb between current detection times, errors occur in the differentiation and integration, as discussed above. In view of this, the estimation unit 15 estimates the magnetic pole position $\omega_e$ and the rotational speed $\omega_e$ of the AC motor 1 on the basis of the time difference Tb calculated by the time difference calculation unit 13.

Various methods have been studied for estimating the magnetic pole position $\theta_e$ and the rotational speed $\omega_e$. In the medium-to-high speed region of the entire rotational speed range of the AC motor 1, the magnetic pole position $\theta_e$ is generally obtained using information on the speed electromotive force of the AC motor 1. The estimation unit 15 according to the first embodiment estimates the magnetic pole position $\theta_e$ and the rotational speed $\omega_e$ using the arctangent method. Note that the method for estimating the magnetic pole position $\theta_e$ and the rotational speed $\omega_e$ is not limited to the arctangent method. For example, a method that uses an adaptive observer may be applied for estimating the magnetic pole position $\theta_e$ and the rotational speed $\omega_e$. The adaptive observer will be described in the second embodiment.

The arctangent method is widely known as the most primitive position estimation method. Formula (1) below is a voltage equation for a surface magnet type synchronous AC motor in stator coordinates. In Formula (1), "p" is a differential operator, "$R_a$" is the armature resistance, "$L_a$" is the armature inductance, "$v_\alpha$ and $v_\beta$" are voltages in stator coordinates, "$\Phi_a$" is the number of armature interlinkage magnetic fluxes, and "$i_\alpha$ and $i_\beta$" are currents in stator coordinates. Stator coordinates may be hereinafter referred to as stationary coordinates.

[Formula 1]

$$\begin{bmatrix} v_\alpha \\ v_\beta \end{bmatrix} = \begin{bmatrix} R_a + pL_a & 0 \\ 0 & R_a + pL_a \end{bmatrix} \begin{bmatrix} i_\alpha \\ i_\beta \end{bmatrix} + p\Phi_a \begin{bmatrix} \cos\theta_e \\ \sin\theta_e \end{bmatrix} \quad (1)$$

The second term on the right side of Formula (1) represents the speed electromotive force. Note that the term representing the speed electromotive force can be expressed in the form of Formula (2) below. In Formula (2), "$e_\alpha$" is the α-axis speed electromotive force, "$e_\beta$" is the β-axis speed electromotive force, "p" is a differential operator, "$\varphi_{\alpha r}$" is the rotor α-axis magnetic flux, "$\varphi_{\beta r}$" is the rotor β-axis magnetic flux, and "$\Phi_a$" is the number of armature interlinkage magnetic fluxes.

[Formula 2]

$$\begin{bmatrix} e_\alpha \\ e_\beta \end{bmatrix} = p \begin{bmatrix} \phi_{\alpha r} \\ \phi_{\beta r} \end{bmatrix} = p\Phi_a \begin{bmatrix} \cos\theta_e \\ \sin\theta_e \end{bmatrix} = \omega_e \Phi_a \begin{bmatrix} -\sin\theta_e \\ \cos\theta_e \end{bmatrix} \quad (2)$$

As can be seen from Formula (1), the speed electromotive force includes $\theta_e$ that is magnetic pole position information. The magnetic pole position $\theta_e$ is computed modifying Formula (1). First, the term of the rotor magnetic flux is put on the left side and the other terms are put on the right side, whereby Formula (3) below is obtained. Since differential calculation amplifies noise, both sides of Formula (3) are integrated, whereby Formula (4) below is obtained. Here, in a case where there is a DC offset in a voltage sensor or the like, the use of pure integration makes the integral diverge; therefore, it is common practice to use approximate integration with a low-pass filter so as not to integrate the DC component when calculating Formula (4).

[Formula 3]

$$p\begin{bmatrix} \phi_{\alpha r} \\ \phi_{\beta r} \end{bmatrix} = \begin{bmatrix} v_\alpha \\ v_\beta \end{bmatrix} - R_a \begin{bmatrix} i_\alpha \\ i_\beta \end{bmatrix} - pL_a \begin{bmatrix} i_\alpha \\ i_\beta \end{bmatrix} \quad (3)$$

[Formula 4]

$$\begin{bmatrix} \hat{\phi}_{\alpha r} \\ \hat{\phi}_{\beta r} \end{bmatrix} = \begin{bmatrix} \int (v_\alpha - R_a i_\alpha) \cdot dt \\ \int (v_\beta - R_a i_\beta) \cdot dt \end{bmatrix} - L_a \begin{bmatrix} i_\alpha \\ i_\beta \end{bmatrix} \quad (4)$$

In Formula (4), the symbol "^" represents an estimated value. The rotor magnetic flux is obtained from calculation of Formula (4), and the arctangent calculation represented by Formula (5) below is performed using the obtained rotor magnetic flux, thereby estimating the magnetic pole position $\theta_e$ of the rotor. The rotational speed $\omega_e$ can be calculated using the estimated magnetic pole position $\theta_e$ of the rotor; therefore, an estimated speed $\omega_e\hat{}$ can be calculated with Formula (6) below. In order to avoid the influence of differential noise, a low-pass filter is usually applied when the estimated speed $\omega_e\hat{}$ is used for control. Alternatively, the estimated speed $\omega_e\hat{}$ can also be calculated by estimating the speed electromotive force and dividing the amplitude of the speed electromotive force by the number of armature interlinkage magnetic fluxes $\Phi_a$, as represented by Formula (7) below. The speed electromotive force can be calculated by calculating the right side of Formula (3). Since the magnetic flux of the permanent magnet fluctuates with temperature changes, however, the calculation method of Formula (7) produces steady speed estimation errors due to temperature changes. Errors due to the speed estimation method with Formula (6) are smaller than errors due to the method represented by Formula (7). In addition, the arctangent method has the advantage of requiring a small calculation amount. The first embodiment describes the speed estimation by Formula (6).

[Formula 5]

$$\hat{\theta}_e = \tan^{-1}\left(\frac{\hat{\phi}_{\beta r}}{\hat{\phi}_{\alpha r}}\right) \quad (5)$$

[Formula 6]

$$\hat{\omega}_e = \frac{d}{dt}\hat{\theta}_e \quad (6)$$

[Formula 7]

$$\hat{\omega}_e = \frac{\sqrt{\hat{e}_\alpha^2 + \hat{e}_\beta^2}}{\Phi_a} \quad (7)$$

First, the discretization of the computation of the arctangent method represented by Formulas (4) to (6) will be described assuming that the above-described time difference Tb between current detection times does not fluctuate. The voltage drop due to the armature resistance of the AC motor 1 is subtracted from the voltage in the stationary coordinate system applied to the AC motor 1, and approximate integration can be computed with a low-pass filter as in Formula (8) below. In Formula (8), "$T_s$" represents a control cycle, "$T_{LPF}$" represents a time constant of the low-pass filter of approximate integration, "n" represents a value representing the present sampling point, and "n−1" represents a value representing the previous sampling point. The present sampling point can also be referred to as the current sampling point. It can be said that Formula (8) is a discretized form of the integral of the first term on the right side of Formula (4). The low-pass filter is discretized with a backward difference in this example, but the low-pass filter may be discretized using a forward difference or the bilinear transform.

[Formula 8]

$$\begin{bmatrix} v_{\alpha LPF}(n) \\ v_{\beta LPF}(n) \end{bmatrix} = \begin{bmatrix} v_{\alpha LPF}(n-1) \\ v_{\beta LPF}(n-1) \end{bmatrix} + \quad (8)$$

$$\left\{\begin{bmatrix} v_\alpha(n-1) \\ v_\beta(n-1) \end{bmatrix} - R_a \begin{bmatrix} i_\alpha(n-1) \\ i_\beta(n-1) \end{bmatrix} - \begin{bmatrix} v_{\alpha LPF}(n-1) \\ v_{\beta LPF}(n-1) \end{bmatrix}\right\} \frac{T_s}{T_{LPF}}$$

The rotor magnetic flux in the stationary coordinate system can be discretized as represented by Formula (9) below. An estimated position $\theta_e\hat{}(n)$ at the present sampling point can be therefore calculated with Formula (10) below. In addition, using the estimated position $\hat{\theta}_e(n)$ at the present sampling point and the estimated position $\hat{\theta}_e(n-1)$ at the previous sampling point, the estimated speed $\hat{\omega}_e$ between the two sampling points can be calculated with Formula (11) below. In Formula (11), "$\hat{\theta}_e$" represents an estimated value of "$\theta_e$", and "$\hat{\omega}_e$" represents an estimated value of "$\omega_e$".

[Formula 9]
$$\begin{bmatrix} \phi_{\alpha r}(n) \\ \phi_{\beta r}(n) \end{bmatrix} = \begin{bmatrix} v_{\alpha LPF}(n) \\ v_{\beta LPF}(n) \end{bmatrix} - L_a \begin{bmatrix} i_\alpha(n) \\ i_\beta(n) \end{bmatrix} \quad (9)$$

[Formula 10]
$$\hat{\theta}_e(n) = \tan^{-1}\left(\frac{\phi_{\beta r}(n)}{\phi_{\alpha r}(n)}\right) \quad (10)$$

[Formula 11]
$$\hat{\omega}_e\left(n - \frac{1}{2}\right) = \frac{\hat{\theta}_e(n) - \hat{\theta}_e(n-1)}{T_s} \quad (11)$$

However, as described above, the time difference Tb between current detection times fluctuates from moment to moment. Computation without the use of this time difference Tb between current detection times causes errors in the estimated position $\hat{\theta}_e$ and the estimated speed $\hat{\omega}_e$.

In view of this, the estimation unit 15 performs computation with the arctangent method, using the time difference Tb between current detection times. When the time difference Tb between current detection times is expressed as $T_s + \Delta T(n)$, the low-pass filter computation expressed by Formula (8) can be rewritten as Formula (12) below.

[Formula 12]
$$\begin{bmatrix} v_{\alpha LPF}(n) \\ v_{\beta LPF}(n) \end{bmatrix} = \begin{bmatrix} v_{\alpha LPF}(n-1) \\ v_{\beta LPF}(n-1) \end{bmatrix} + \left\{ \begin{bmatrix} v_\alpha(n-1) \\ v_\beta(n-1) \end{bmatrix} - R_a \begin{bmatrix} i_\alpha(n-1) \\ i_\beta(n-1) \end{bmatrix} - \begin{bmatrix} v_{\alpha LPF}(n-1) \\ v_{\beta LPF}(n-1) \end{bmatrix} \right\} \frac{T_s + \Delta T(n)}{T_{LPF}} \quad (12)$$

Substituting the value obtained with Formula (12) into Formula (9) can calculate the rotor magnetic flux in the stationary coordinate system. The estimated position $\hat{\theta}_e(n)$ at the present sampling point can be therefore calculated with Formula (10). In addition, the estimated speed $\hat{\omega}_e$ between the two sampling points can be calculated with Formula (13) below using the time difference $Tb = T_s + \Delta T(n)$ between the current detection times.

[Formula 13]
$$\hat{\omega}_e\left(n - \frac{1}{2}\right) = \frac{\hat{\theta}_e(n) - \hat{\theta}_e(n-1)}{T_s + \Delta T(n)} \quad (13)$$

The estimation unit 15 performs coordinate transformation of the phase currents $i_u$, $i_v$, and $i_w$ determined by the phase current determination unit 12 for each sampling point, into the currents $i_\alpha$ and $i_\beta$ in the stationary coordinate system. The estimation unit 15 performs coordinate transformation of the voltage commands $v_u^*$, $v_v^*$, and $v_w^*$ into the voltages $v_\alpha$ and $v_\beta$ in the stationary coordinate system. The estimation unit 15 computes Formula (12) on the basis of the currents $i_\alpha$ and $i_\beta$ and the voltages $v_\alpha$ and $v_\beta$ in the stationary coordinate system and the time difference Tb calculated by the time difference calculation unit 13. The estimation unit 15 substitutes the value calculated with Formula (12) and the currents $i_\alpha$ and $i_\beta$ in the stationary coordinate system, into Formula (9) to calculate the rotor magnetic flux in the stationary coordinate system. The estimation unit 15 substitutes the rotor magnetic flux in the stationary coordinate system calculated with Formula (9), into Formula (10) to thereby calculate the estimated position $\hat{\theta}_e$. In addition, the estimation unit 15 substitutes the estimated position $\hat{\theta}_e$ calculated with the computation of Formula (10) and the time difference Tb calculated by the time difference calculation unit 13, into Formula (13) to thereby calculate the estimated speed $\hat{\omega}_e$.

The domain of $\Delta T(n)$ expressed by Formulas (12) and (13) is $-0.5 \times T_s < \Delta T(n) < 0.5 \times T_s$, as can be seen from FIG. 5. As a result, there is a large difference in error between the computation with Formulas (12) and (13) and the computation with Formulas (8) and (11). In other words, there is a large difference in estimation error depending on whether to use $\Delta T$ in estimation processing.

Speed estimation through computation with Formula (11) will be described. The description is made giving an example in which the carrier frequency, which is the frequency of the carrier wave Sc, is 5 kHz and the phase current determination unit 12 determines the values of the three phase currents $i_u$, $i_v$, and $i_w$ once per period of the carrier wave Sc. The control period $T_s$ is the reciprocal of the carrier frequency, and is 200 μs.

When the rotational speed $\omega_e$ of the AC motor 1 is 2500 rad/s, the magnetic pole position 19, of the AC motor 1 advances by 0.5 rad during 200 μs. The time difference Tb between current detection times fluctuates in the range of 100 μs to 300 μs. As a result, when the time difference Tb is, for example, 300 μs, the magnetic pole position $\theta_e$ advances by 0.75 rad during 300 μs. In this case, if 0.75 rad is divided by the control cycle $T_s$ as in Formula (11), the estimated speed $\hat{\omega}_e$ is 3750 rad, which is 1.5 times the true value of the rotational speed $\omega_e$. This estimation error is too large to be ignored in the control of the AC motor 1.

Since the average of $\Delta T(n)$ is zero, it is possible to remove the error caused by $\Delta T(n)$ by applying the low-pass filter to the estimated speed $\hat{\omega}_e$. However, the insertion of the low-pass filter in the control loop leads to a decrease in control response. For this reason, it is difficult to achieve high-speed response with the estimation processing through the computation of Formula (11).

Since the estimation unit 15 performs the computation of Formula (13), 0.75 rad is divided by the time difference Tb. The estimated speed $\hat{\omega}_e$ is therefore 2500 rad, which matches the true value of the rotational speed $\omega_e$. By thus performing computation with Formula (13), the estimation unit 15 can significantly reduce errors in speed estimation as compared with the case of performing computation with Formula (11). In addition, by performing the computation of Formula (12), the estimation unit 15 can significantly reduce errors in position estimation as compared with the case of performing the computation of Formula (8).

As described above, the estimation device 9 according to the first embodiment includes the bus current detection unit 11, the phase current determination unit 12, the time difference calculation unit 13, and the estimation unit 15. The bus current detection unit 11 detects the value of the bus current $i_{bus}$ that is the current flowing through the DC bus 61 of the voltage-source inverter 4 driven by the plurality of gate pulse signals $G_u$, $G_v$, and $G_w$ generated on the basis of the voltage commands $v_u^*$, $v_v^*$, and $v_w^*$. The phase current determination unit 12 determines the values of the phase currents $i_u$, $i_v$, and $i_w$ supplied from the voltage-source inverter 4 to the AC motor 1 on the basis of the values of the bus current $i_{bus}$ detected by the bus current detection unit 11 and the states of the plurality of gate pulse signals $G_u$, $G_v$, and $G_w$. The time difference calculation unit 13 calculates the time difference Tb between the current detection time identified as the time of detection of the bus current $i_{bus}$ used in the previous determination process by the phase current determination unit 12 and the current detection time identified as the time of detection of the bus current $i_{bus}$ used in the present determination process by the phase current determination unit 12. The current detection time identified as the time of detection of the bus current $i_{bus}$ used in the previous determination process by the phase current determination unit 12 is an example of a first current detection time. The current detection time identified as the time of detection of the bus current $i_{bus}$ used in the present determination process by the phase current determination unit 12 is an example of a second current detection time. The estimation unit 15 estimates at least one of the magnetic pole position $\theta_e$ and the rotational speed $\omega_e$ of the AC motor 1 on the basis of the voltage commands $v_u^*$, $v_v^*$, and $v_w^*$, the values of the phase currents $i_u$, $i_v$, and $i_w$, and the time difference Tb. As discussed above, the estimation device 9 performs estimation processing, using the time difference Tb between current detection times in the phase current determination unit 12. The estimation device 9 can therefore shorten the determination period, which is the period of the process for determining the values of the three phase currents $i_u$, $i_v$, and $i_w$, as compared with the case of determining the values of the three-phase currents through interpolation processing from the value of the bus current $i_{bus}$ detected in each of two consecutive half periods of the carrier wave Sc. In addition, since the estimation device 9 uses the time difference Tb between current detection times for the estimation of the magnetic pole position $\theta_e$ and the rotational speed $\omega_e$, the estimation accuracy of the magnetic pole position $\theta_e$ and the rotational speed $\omega_e$ can be enhanced even when the fluctuation of the time difference Tb between current detection times is large. Thus, when the AC motor 1 rotates at high speed or when zero-vector modulation is performed, the estimation accuracy of the magnetic pole position $\theta_e$ and the rotational speed $\omega_e$ can be enhanced.

In addition, the gate pulse signals $G_u$, $G_v$, and $G_w$ are generated on the basis of comparison between the voltage commands $v_u^*$, $v_v^*$, and $v_w^*$ and the carrier wave Sc. Moreover, the time difference Tb between current detection times is longer than a half period of the carrier wave Sc and shorter than 1.5 times a period of the carrier wave Sc. Consequently, the estimation device 9 can enhance the estimation accuracy of the magnetic pole position $\theta_e$ and the rotational speed $\omega_e$ when the AC motor 1 rotates at high speed or when zero-vector modulation is performed.

In addition, the drive device 2 including the estimation device 9 includes the pulse shift processing unit 22 that temporally shifts at least one of the plurality of gate pulse signals $G_u$, $G_v$, and $G_w$ that are input to the voltage-source inverter 4. Among the gate pulse signals $G_u$, $G_v$, and $G_w$, the pulse shift processing unit 22 temporally shifts at least one of two gate pulse signals in which the interval between changes is less than the preset period of time TA to make the interval between the changes in the two gate pulse signals longer than or equal to the preset period of time TA. Consequently, the latency to the convergence of ringing can be secured regardless of the values of the voltage commands $v_u^*$, $v_v^*$, and $v_w^*$.

In addition, the drive device 2 includes the zero-vector modulation unit 34 that adds a random number value to the voltage commands $v_u^*$, $v_v^*$, and $v_w^*$ to thereby irregularly change the output ratio between two types of zero-voltage vectors that are output from the voltage-source inverter 4. Consequently, the spectral peak of carrier noise is dispersed through zero-vector modulation so that carrier noise can be reduced. In the case of zero-vector modulation, the waveform of the voltage command of the intermediate phase rapidly changes even when the AC motor 1 rotates at low speed, resulting in a large change in the time difference Tb between current detection times. Even in such a case, the estimation device 9 can enhance the estimation accuracy of the magnetic pole position $\theta_e$ and the rotational speed $\omega_e$.

Second Embodiment

The estimation unit of the estimation device according to the second embodiment is different from the estimation unit of the estimation device according to the first embodiment in that the position and speed of the AC motor are estimated using an adaptive observer. In the following description, components having the same functions as those in the first embodiment are denoted by the same reference signs, and descriptions thereof are omitted. The difference from the first embodiment is mainly described.

Figure 15:
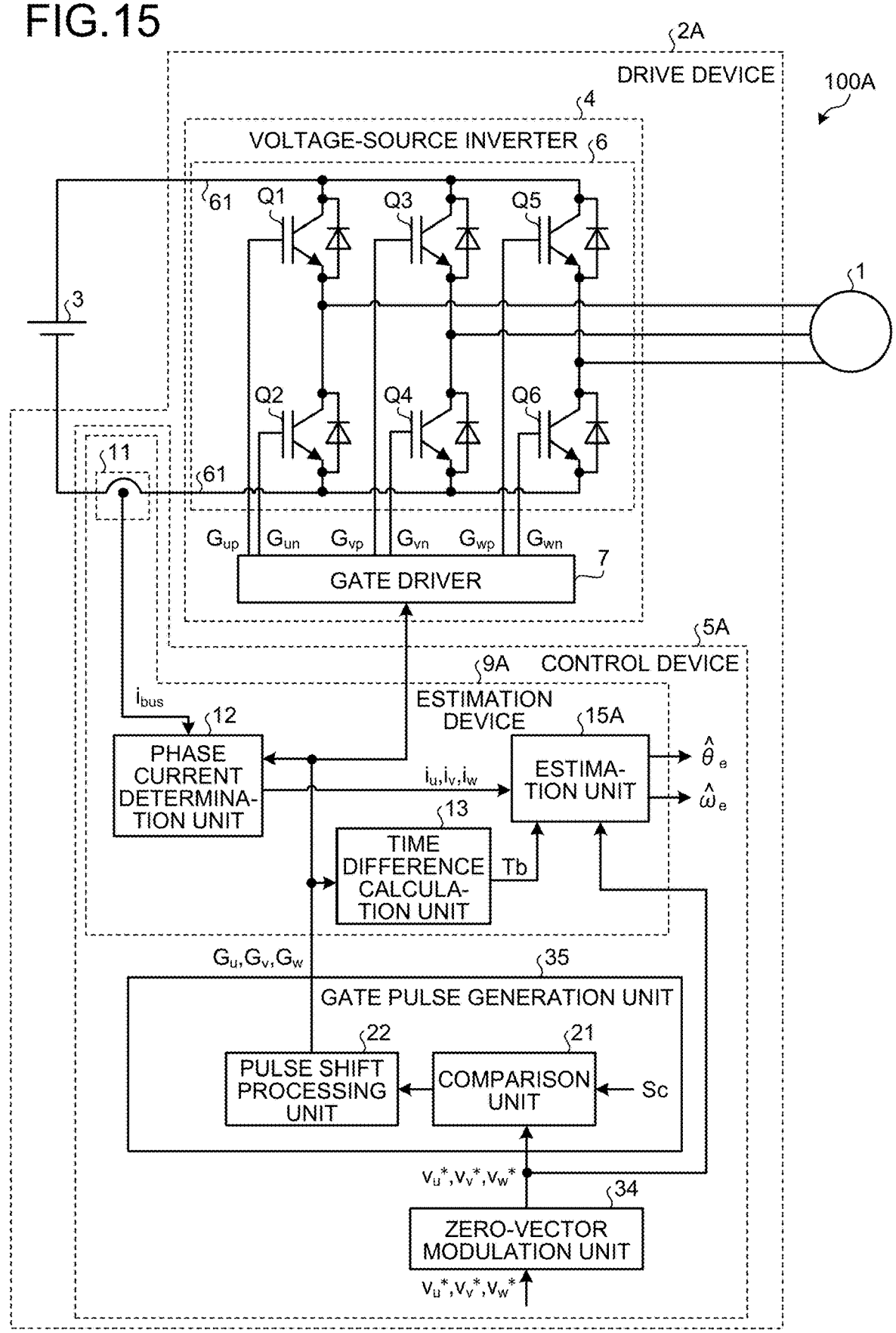
FIG. 15 is a diagram illustrating an exemplary configuration of an electric motor system including an estimation device according to a second embodiment of the present invention.

FIG. 15 is a diagram illustrating an exemplary configuration of an electric motor system including an estimation device according to the second embodiment of the present invention. As illustrated in FIG. 15, the electric motor system 100A according to the second embodiment includes a drive device 2A including a control device 5A, instead of the drive device 2 including the control device 5. The control device 5A includes an estimation device 9A including an estimation unit 15A, instead of the estimation device 9 including the estimation unit 15.

Figure 16:
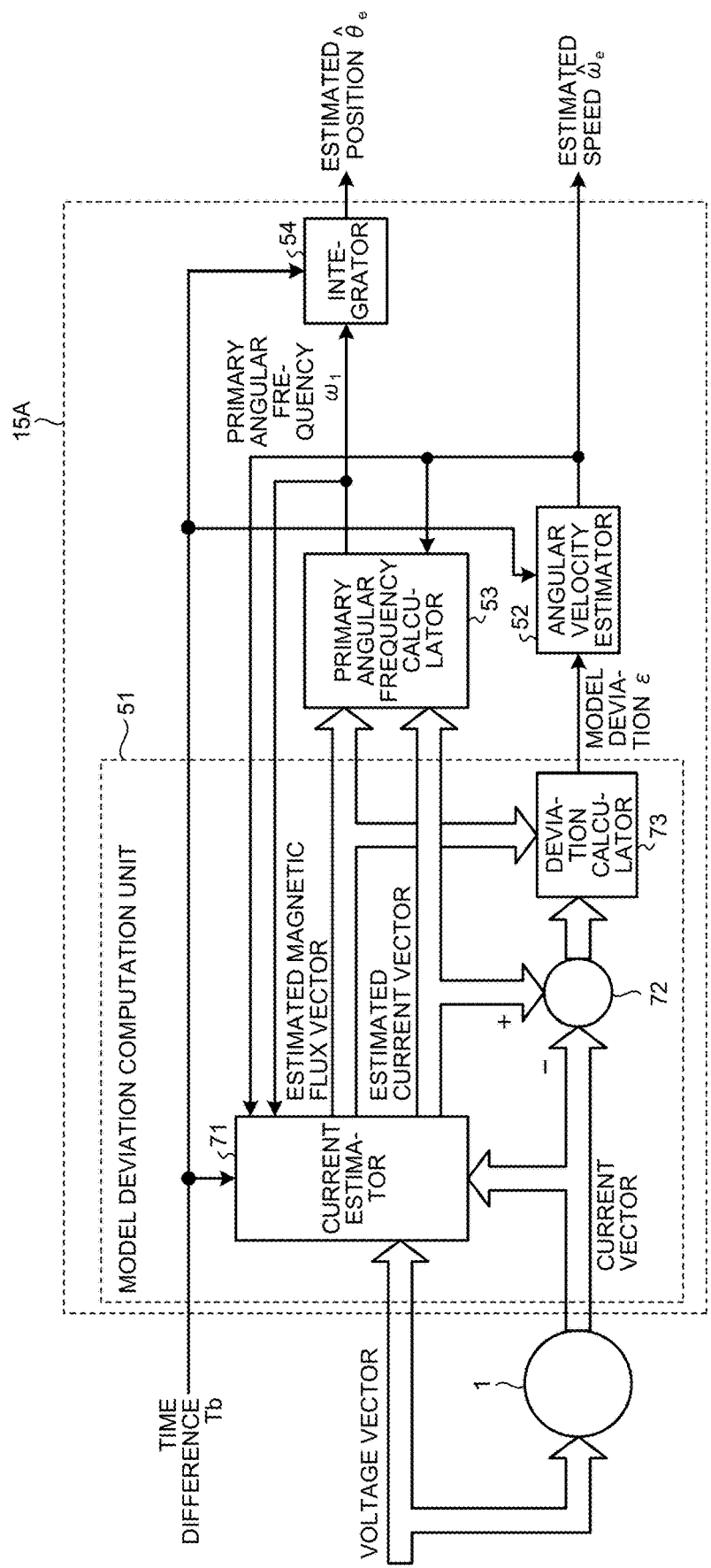
FIG. 16 is a diagram illustrating an exemplary configuration of an estimation unit according to the second embodiment.

FIG. 16 is a diagram illustrating an exemplary configuration of the estimation unit according to the second embodiment. The estimation unit 15A is configured by an adaptive observer, and estimates the magnetic pole position $\theta_e$ and the rotational speed $\omega_e$ of the AC motor 1. The adaptive observer, which is defined by an equation of state in which the stator magnetic flux and the rotor magnetic flux of the AC motor 1 are state quantities, is also referred to as an adaptive magnetic flux observer. Note that the adaptive observer can also be defined employing extended induced voltage, current, or the like as a state quantity.

The estimation unit 15A illustrated in FIG. 16 calculates the estimated speed $\omega_e\hat{}$ and the estimated position $\omega_e\hat{}$, using a voltage vector, a current vector, and the time difference Tb between current detection times, and outputs the calculated, estimated speed $\omega_e\hat{}$ and estimated position $\theta_e\hat{}$. The voltage vector is the vector of the voltage output from the voltage-source inverter 4 to the AC motor 1, and the current vector is the vector of the current output from the voltage-source inverter 4 to the AC motor 1.

The estimation unit 15A includes a model deviation computation unit 51, an angular velocity estimator 52, a primary angular frequency calculator 53, and an integrator 54. The model deviation computation unit 51 computes a model deviation $\varepsilon$ on the basis of the voltage vector, the current vector, a primary angular frequency $\omega_1$, the estimated speed $\omega_e\hat{}$, and the time difference Tb between current detection times. The angular velocity estimator 52 computes the estimated speed $\omega_e\hat{}$ on the basis of the model deviation $\varepsilon$ and the time difference Tb between current detection times. The primary angular frequency calculator 53 computes the primary angular frequency $\omega_1$, using an estimated magnetic flux vector, an estimated current vector, and the estimated speed $\hat{\omega}_e$. The integrator 54 integrates the primary angular frequency $\omega_1$ on the basis of the time difference Tb between current detection times and outputs the estimated position $\hat{\theta}_e$.

The model deviation computation unit 51 includes a current estimator 71, a subtractor 72, and a deviation calculator 73. The current estimator 71 calculates the estimated magnetic flux vector and the estimated current vector on the basis of the voltage vector, the current vector, the primary angular frequency $\omega_1$, the estimated speed $\hat{\omega}_e$, and the time difference Tb between current detection times, and outputs the calculated, estimated magnetic flux vector and estimated current vector. The subtractor 72 calculates a current deviation vector by subtracting the current vector from the estimated current vector, and outputs the calculated current deviation vector.

The deviation calculator 73 receives an input of the current deviation vector from the subtractor 72, extracts the quadrature component of the estimated magnetic flux vector as a scalar quantity, and outputs the extracted scalar quantity as the model deviation $\varepsilon$. Known methods for extracting the quadrature component of the estimated magnetic flux vector as a scalar quantity include coordinate transformation of the current deviation vector onto a rotating orthogonal coordinate system and computation of the magnitude of the outer product of the current deviation vector and the estimated magnetic flux vector.

The current estimator 71 estimates the current and the magnetic flux from the equation of state of the AC motor 1. Although the AC motor 1 is described herein as a general permanent magnet embedded synchronous motor, the AC motor 1 may be any other type of motor to which the equation of state thereof is applicable, such as an induction motor, a surface permanent magnet type synchronous motor, a wound field type synchronous motor, or a reluctance type synchronous motor. That is, using a similar method, the current estimator 71 can perform current estimation for other types of motors.

In the case where the AC motor 1 is a permanent magnet embedded synchronous motor, the equation of state is expressed by Formulas (14) and (15) below. In Formulas (14) and (15), "$L_d$" represents the d-axis inductance, "$L_q$" represents the q-axis inductance, "$i_d$" represents the d-axis current, "$i_q$" represents the q-axis current, "$\varphi_{ds}$" represents the d-axis stator magnetic flux, "$\varphi_{qs}$" represents the q-axis stator magnetic flux, "$\varphi_{dr}$" represents the d-axis rotor magnetic flux, and the symbol "^" represents an estimated value. In addition, "$R_a$" represents the armature resistance, "$\omega_1$" represents the primary angular frequency, "$v_d$" represents the d-axis voltage, "$v_q$" represents the q-axis voltage, and "$h_{11}$" to "$h_{32}$" represent observer gains. In addition, the primary angular frequency $\omega_1$ is given as Formula (16) below. Here, "$h_{41}$" and "$h_{42}$" represent observer gains.

[Formula 14]

$$\frac{d}{dt}\begin{bmatrix}\hat{\varphi}_{ds}\\ \hat{\varphi}_{qs}\\ \hat{\varphi}_{dr}\end{bmatrix} = \begin{pmatrix}-\frac{R_a}{L_d} & \omega_1 & 0\\ -\omega_1 & -\frac{R_a}{L_q} & -\hat{\omega}_e\\ 0 & 0 & 0\end{pmatrix}\begin{bmatrix}\hat{\varphi}_{ds}\\ \hat{\varphi}_{qs}\\ \hat{\varphi}_{dr}\end{bmatrix} + \begin{bmatrix}v_d\\ v_q\\ 0\end{bmatrix} - \begin{bmatrix}h_{11} & h_{12}\\ h_{21} & h_{22}\\ h_{31} & h_{32}\end{bmatrix}\begin{bmatrix}\hat{i}_d - i_d\\ \hat{i}_q - i_q\end{bmatrix} \quad (14)$$

[Formula 15]

$$\begin{bmatrix}\hat{i}_d\\ \hat{i}_q\end{bmatrix} = \begin{bmatrix}1/L_d & 0 & 0\\ 0 & 1/L_q & 0\end{bmatrix}\begin{bmatrix}\hat{\varphi}_{ds}\\ \hat{\varphi}_{qs}\\ \hat{\varphi}_{dr}\end{bmatrix} \quad (15)$$

[Formula 16]

$$\omega_1 = \hat{\omega}_e - \frac{h_{41}(\hat{i}_d - i_d) + h_{42}(\hat{i}_q - i_q)}{\hat{\varphi}_{dr}} \quad (16)$$

Formulas (14) and (15) are based on the normal induced voltage, but Formulas (14) and (15) can be modified and expressed in the form of an extended induced voltage, in which case similar calculations are also possible. Note that Formulas (14) and (15) are mathematical expressions in dq rotating coordinates, but Formulas (14) and (15) can be modified and expressed in the form of another coordinate system such as stationary $\alpha\beta$ coordinates or three-phase coordinates, in which case similar calculations are also possible. Since Formula (14) includes the estimated speed $\hat{\omega}_e$, an error occurs in current estimation when the estimated speed $\hat{\omega}_e$ does not match the actual rotational speed $\omega_e$. Here, the model deviation $\varepsilon$ is defined as Formula (17) below, and the estimation unit 15A adjusts the value of the estimated speed $\hat{\omega}_e$, using the angular velocity estimator 52 such that the model deviation $\varepsilon$ becomes zero. The angular velocity estimator 52 is provided by an integrator and a proportional integral controller connected in series with the integrator, for example.

[Formula 17]

$$\varepsilon = \frac{\hat{i}_q - i_q}{\hat{\varphi}_{dr}} \quad (17)$$

The primary angular frequency calculator 53 computes the primary angular frequency $\omega_1$ from the estimated magnetic flux vector, the estimated current vector, and the estimated speed $\hat{\omega}_e$, on the basis of Formula (16). The integrator 54 estimates the magnetic pole position $\theta_e$ by integrating the primary angular frequency $\theta_1$. The adaptive observer is advantageous in being robust with respect to fluctuations in the number of interlinkage magnetic fluxes and not producing steady speed estimation errors, and thus is a high-performance speed estimation method.

The equation of state of Formulas (14) and (15) requires attention when discretized because the time difference Tb between current detection times fluctuates. Through discretization with the Euler method, Formulas (18) to (21) below are obtained. In Formulas (18) to (21), "$T_s$" represents a control cycle, "n" represents a value indicating the present sampling point, "n−1" represents a value indicating the previous sampling point, and "$t_{avg}$" represents the period of time from a current detection sample point to a trough of the carrier wave Sc. The trough of the carrier wave Sc indicates, for example, a position at which the carrier wave Sc reaches the minimum value, and appears at each of times t7 and t16 illustrated in FIG. 5. The current detection sample point is, for example, the current detection time described above. In addition, the primary angular frequency $\omega_1$ is given as Formula (22) below.

[Formula 18]

$$\begin{bmatrix} \hat{\phi}_{ds}(n) \\ \hat{\phi}_{qs}(n) \\ \hat{\phi}_{dr}(n) \end{bmatrix} = \begin{bmatrix} \hat{\phi}_{ds}(n-1) \\ \hat{\phi}_{qs}(n-1) \\ \hat{\phi}_{dr}(n-1) \end{bmatrix} + \begin{bmatrix} \frac{d}{dt}\hat{\phi}_{ds}(n-1) \\ \frac{d}{dt}\hat{\phi}_{qs}(n-1) \\ \frac{d}{dt}\hat{\phi}_{dr}(n-1) \end{bmatrix} \cdot (T_s + \Delta T(n-1)) \quad (18)$$

[Formula 19]

$$\frac{d}{dt}\begin{bmatrix} \hat{\phi}_{ds}(n-1) \\ \hat{\phi}_{qs}(n-1) \\ \hat{\phi}_{dr}(n-1) \end{bmatrix} = \begin{bmatrix} -R_a/L_d & \omega_1(n-1) & 0 \\ -\omega_1(n-1) & -R_a/L_q & -\hat{\omega}_e(n-1) \\ 0 & 0 & 0 \end{bmatrix} \quad (19)$$

$$\begin{bmatrix} \hat{\phi}_{ds}(n-1) \\ \hat{\phi}_{qs}(n-1) \\ \hat{\phi}_{dr}(n-1) \end{bmatrix} + \begin{bmatrix} v_d(n-1) \\ v_q(n-1) \\ 0 \end{bmatrix} - \begin{bmatrix} h_{11} & h_{12} \\ h_{21} & h_{22} \\ h_{31} & h_{32} \end{bmatrix}\begin{bmatrix} \hat{i}_d(n-1) - i_d(n) \\ \hat{i}_q(n-1) - i_q(n) \end{bmatrix}$$

[Formula 20]

$$\begin{bmatrix} \hat{i}_d(n) \\ \hat{i}_q(n) \end{bmatrix} = \begin{bmatrix} 1/L_d & 0 & 0 \\ 0 & 1/L_q & 0 \end{bmatrix}\begin{bmatrix} \hat{\phi}_{ds}(n) \\ \hat{\phi}_{qs}(n) \\ \hat{\phi}_{dr}(n) \end{bmatrix} \quad (20)$$

[Formula 21]

$$\Delta t_{(n-1)} = t_{avg(n-1)} - t_{avg(n)} \quad (21)$$

[Formula 22]

$$\omega_1(n) = \hat{\omega}_e(n) - \frac{h_{41}(\hat{i}_d(n-1) - i_d(n)) + h_{42}(\hat{i}_q(n-1) - i_q(n))}{\hat{\phi}_{dr}(n)} \quad (22)$$

The model deviation computation unit 51 of the estimation unit 15A performs coordinate transformation, using the estimated position $\hat{\theta}_e$. Using the estimated position $\hat{\theta}_e$ obtained by the integrator 54, the model deviation computation unit 51 performs coordinate transformation of the three phase currents $i_u$, $i_v$, and $i_w$ into currents in a dq coordinate system that is a rotating orthogonal coordinate system, thereby obtaining the d-axis current $i_d$ and the q-axis current $i_q$. In addition, using the estimated position $\hat{\theta}_e$ obtained by the integrator 54, the model deviation computation unit 51 performs coordinate transformation of the three-phase voltage commands $v_u^*$, $v_v^*$, and $v_w^*$ into voltages in a dq coordinate system that is a rotating orthogonal coordinate system, thereby obtaining the d-axis voltage $v_d$ and the q-axis voltage $v_q$. Note that the estimated position $\hat{\theta}_e$ used in coordinate transformation for obtaining the d-axis voltage $v_d$ and the q-axis voltage $v_q$ is preferably that at the middle time between the current detection times, for example. Note that although the stator magnetic flux and the rotor magnetic flux are used as state quantities in the equation of state of Formulas (19) and (20), current or extended induced voltage may be used as a state quantity.

Since Formula (19) includes the estimated speed $\hat{\omega}_e$, an error occurs in current estimation when the estimated speed $\hat{\omega}_e$ does not match the actual rotational speed $\omega_e$. Here, the model deviation $\varepsilon$ is defined as Formula (23) below, and the estimation unit 15A adjusts the value of the estimated speed $\hat{\omega}_e$, using the angular velocity estimator 52 such that the model deviation $\varepsilon$ becomes zero. The angular velocity estimator 52 calculates the estimated speed $\hat{\omega}_e$ through the computation of Formulas (24) to (26) below. In Formula (25), "$x_a$" is a state quantity of proportional integral control, and "n+1" is a next sampling point.

[Formula 23]

$$\varepsilon(n) = \frac{\hat{i}_q(n-1) - i_q(n)}{\hat{\phi}_{dr}(n)} \quad (23)$$

[Formula 24]

$$\frac{d}{dt}\hat{\omega}_e(n) = K_{ap}(\varepsilon(n) + \omega_{api}x_a(n)) \quad (24)$$

[Formula 25]

$$x_a(n+1) = x_a(n) + (T_s + \Delta T(n)) \cdot \varepsilon(n) \quad (25)$$

[Formula 26]

$$\hat{\omega}_e(n) = \hat{\omega}_e(n-1) + (T_s + \Delta T(n-1)) \cdot \frac{d}{dt}\hat{\omega}_e(n-1) \quad (26)$$

$\Delta T(n)$ is used in Formula (25), and $\Delta T(n-1)$ is used in Formula (26). The estimation unit 15A can therefore accurately calculate the estimated speed $\hat{\omega}_e$ even when the time difference Tb between current detection times fluctuates.

The primary angular frequency calculator 53 calculates the primary angular frequency $\omega_1$ by substituting the estimated magnetic flux vector, the estimated current vector, and the estimated speed $\hat{\omega}_e$, into Formula (22). The integrator 54 calculates the estimated position $\hat{\theta}_e$ by integrating the primary angular frequency $\omega_1$, using Formula (27) below. Note that Tb is defined as Tb=$T_s$+$\Delta T(n)$. Since $\Delta T(n)$ is used in Formula (27), the estimation unit 15A can accurately calculate the estimated position $\hat{\theta}_e$ even when the time difference Tb between current detection times fluctuates.

[Formula 27]

$$\hat{\theta}_{e(n+1)} = \hat{\theta}_{e(n)} + \omega_{1(n)} \cdot (T_s + \Delta T_{(n)}) \quad (27)$$

As described above, the estimation unit 15A according to the second embodiment includes the current estimator 71, the subtractor 72, the deviation calculator 73, and the angular velocity estimator 52. The current estimator 71 is an example of a state quantity estimation unit, the subtractor 72 and the deviation calculator 73 are an example of an error calculation unit, and the angular velocity estimator 52 is an example of a speed estimation unit. The current estimator 71 estimates the magnetic flux vector and the current vector of the AC motor 1, and outputs the results of the estimation, i.e., the estimated magnetic flux vector and the estimated current vector. The magnetic flux vector is an example of a state quantity. The deviation calculator 73 calculates the model deviation $\varepsilon$. The model deviation $\varepsilon$ is an example of an error in the state quantity. The angular velocity estimator 52 calculates the estimated speed $\hat{\omega}_e$ on the basis of the model deviation $\varepsilon$ and the time difference Tb. In addition, the current estimator 71 calculates the estimated magnetic flux vector and the estimated current vector on the basis of the voltage vector, the current vector, the primary angular frequency $\omega_1$, the estimated speed $\hat{\omega}_e$, and the time difference Tb between current detection times. Since no steady speed estimation error is produced in the estimation unit 15A, speed estimation can be accurately performed.

Third Embodiment

The third embodiment is different from the drive devices according to the first and second embodiments in that the position and speed of the AC motor are estimated using the voltage applied from the voltage-source inverter to the AC motor between current detection times. In the following description, components having the same functions as those in the first embodiment are denoted by the same reference signs, and descriptions thereof are omitted. The difference from the control devices 5 and 5A according to the first and second embodiments is mainly described.

Figure 17:
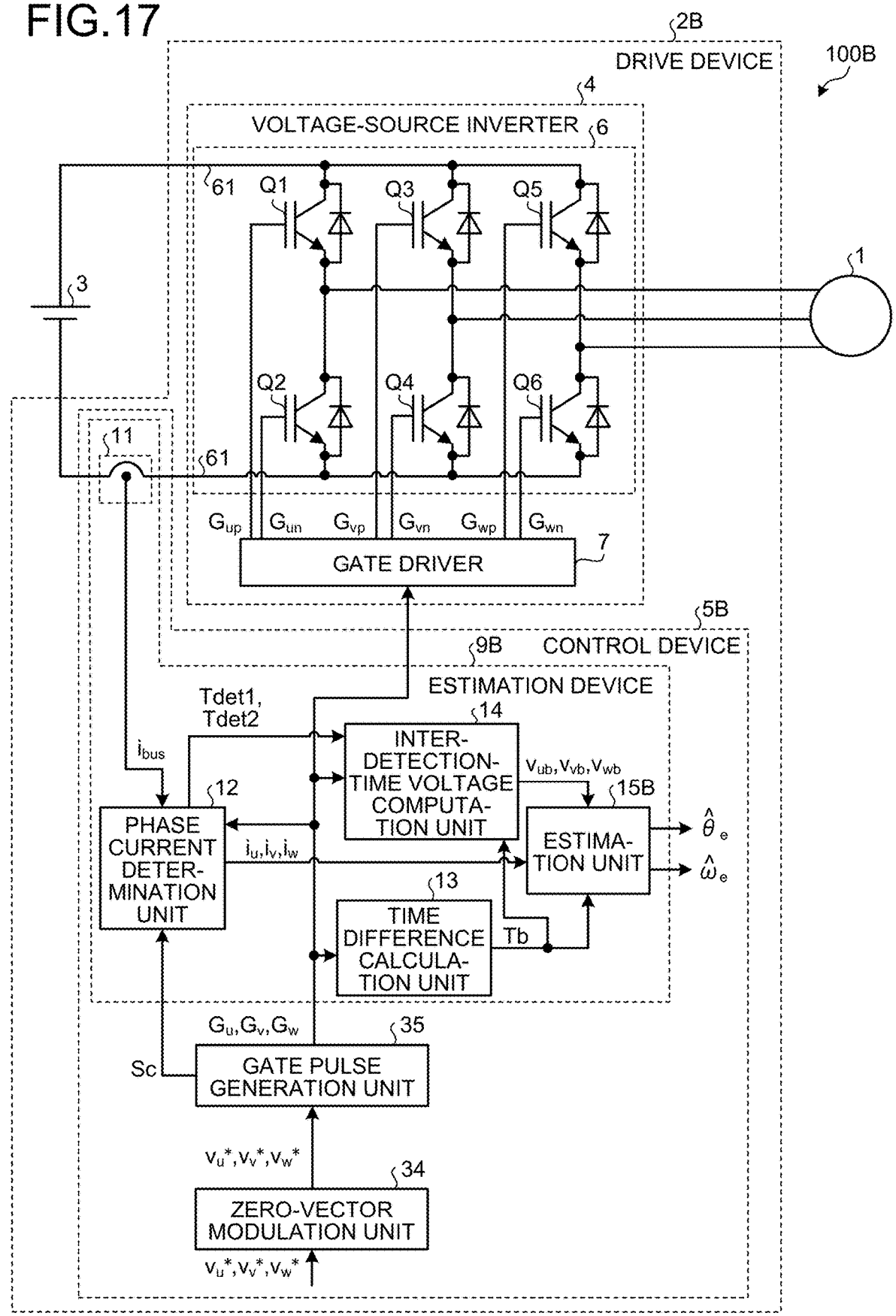
FIG. 17 is a diagram illustrating an exemplary configuration of an electric motor system including an estimation device according to a third embodiment of the present invention.

FIG. 17 is a diagram illustrating an exemplary configuration of an electric motor system including an estimation device according to the third embodiment of the present invention. As illustrated in FIG. 17, the electric motor system 100B according to the third embodiment includes a drive device 2B including a control device 5B, instead of the drive device 2 including the control device 5 or the drive device 2A including the control device 5A. The control device 5B includes an estimation device 9B, instead of the estimation device 9 or the estimation device 9A.

The estimation device 9B includes the bus current detection unit 11, the phase current determination unit 12, the time difference calculation unit 13, an inter-detection-time voltage computation unit 14, and an estimation unit 15B. The inter-detection-time voltage computation unit 14 calculates the values of three phase voltages $v_{ub}$, $v_{vb}$, and $v_{wb}$ between current detection times on the basis of the gate pulse signals $G_u$, $G_v$, and $G_w$ and the time difference Tb between the current detection times. The values of the phase voltages $v_{ub}$, $v_{vb}$, and $v_{wb}$ calculated by the inter-detection-time voltage computation unit 14 are the instantaneous values of three phase voltages, namely u-phase, v-phase, and w-phase voltages, between current detection times. The estimation unit 15B is different from the estimation unit 15 or the estimation unit 15A in that the estimated speed $\omega_e\hat{}$ and the estimated position $\theta_e\hat{}$ are calculated using the values of the three phase voltages $v_{ub}$, $v_{vb}$, and $v_{wb}$ between current detection times instead of the voltage commands $v_u^*$, $v_v^*$, and $v_w^*$. The phase voltage $v_{ub}$ is a u-phase voltage, the phase voltage $v_{vb}$ is a v-phase voltage, and the phase voltage $v_{wb}$ is a w-phase voltage. Hereinafter, the phase voltage $v_{ub}$ may be referred to as the u-phase voltage $v_{ub}$, the phase voltage $v_{vb}$ may be referred to as the v-phase voltage $v_{vb}$, and the phase voltage $v_{wb}$ may be referred to as the w-phase voltage $v_{wb}$. In addition, the values of the phase voltages $v_{ub}$, $v_{vb}$, and $v_{wb}$ may be simply referred to as the phase voltages $v_{ub}$, $v_{vb}$, and $v_{wb}$.

The inter-detection-time voltage computation unit 14 calculates the values of the three phase voltages $v_{ub}$, $v_{vb}$, and $v_{wb}$ between current detection times on the basis of the duty ratio of each of the gate pulse signals $G_u$, $G_v$, and $G_w$ between the current detection times. Specifically, the inter-detection-time voltage computation unit 14 calculates the value of the u-phase voltage $v_u$ between current detection times on the basis of the ratio of the on-period during which the gate pulse signal $G_u$ is in the on state between the current detection times. Similarly, the inter-detection-time voltage computation unit 14 calculates the value of the v-phase voltage $v_v$ between current detection times on the basis of the on-period during which the gate pulse signal $G_v$ is in the on state between the current detection times. In addition, the inter-detection-time voltage computation unit 14 calculates the value of the w-phase voltage $v_w$ between current detection times on the basis of the on-period during which the gate pulse signal $G_w$ is in the on state between the current detection times.

Figure 18:
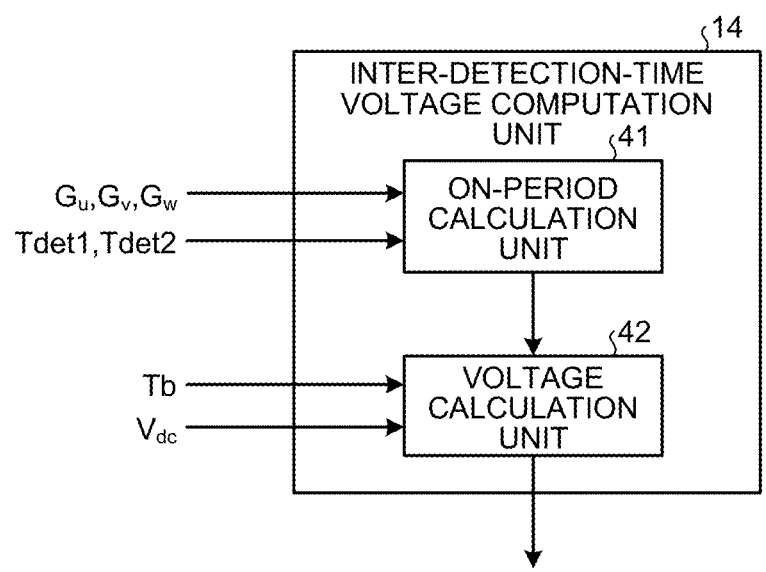
FIG. 18 is a diagram illustrating an exemplary configuration of an inter-detection-time voltage computation unit according to the third embodiment.

FIG. 18 is a diagram illustrating an exemplary configuration of the inter-detection-time voltage computation unit according to the third embodiment. As illustrated in FIG. 18, the inter-detection-time voltage computation unit 14 includes an on-period calculation unit 41 and a voltage calculation unit 42. The on-period calculation unit 41 calculates the on-period during which each of the plurality of gate pulse signals $G_u$, $G_v$, and $G_w$ is in the on state between current detection times. The voltage calculation unit 42 calculates the values of the three phase voltages $v_{ub}$, $v_{vb}$, and $v_{wb}$ on the basis of the value of the bus voltage $V_{dc}$, the on-period calculated by the on-period calculation unit 41, and the time difference Tb calculated by the time difference calculation unit 13. The bus voltage $V_{dc}$ is the voltage between the low potential side of the DC bus 61 and the high potential side of the DC bus 61, and the value of the bus voltage $V_{dc}$ is the instantaneous value of the bus voltage $V_{dc}$.

Figure 19:
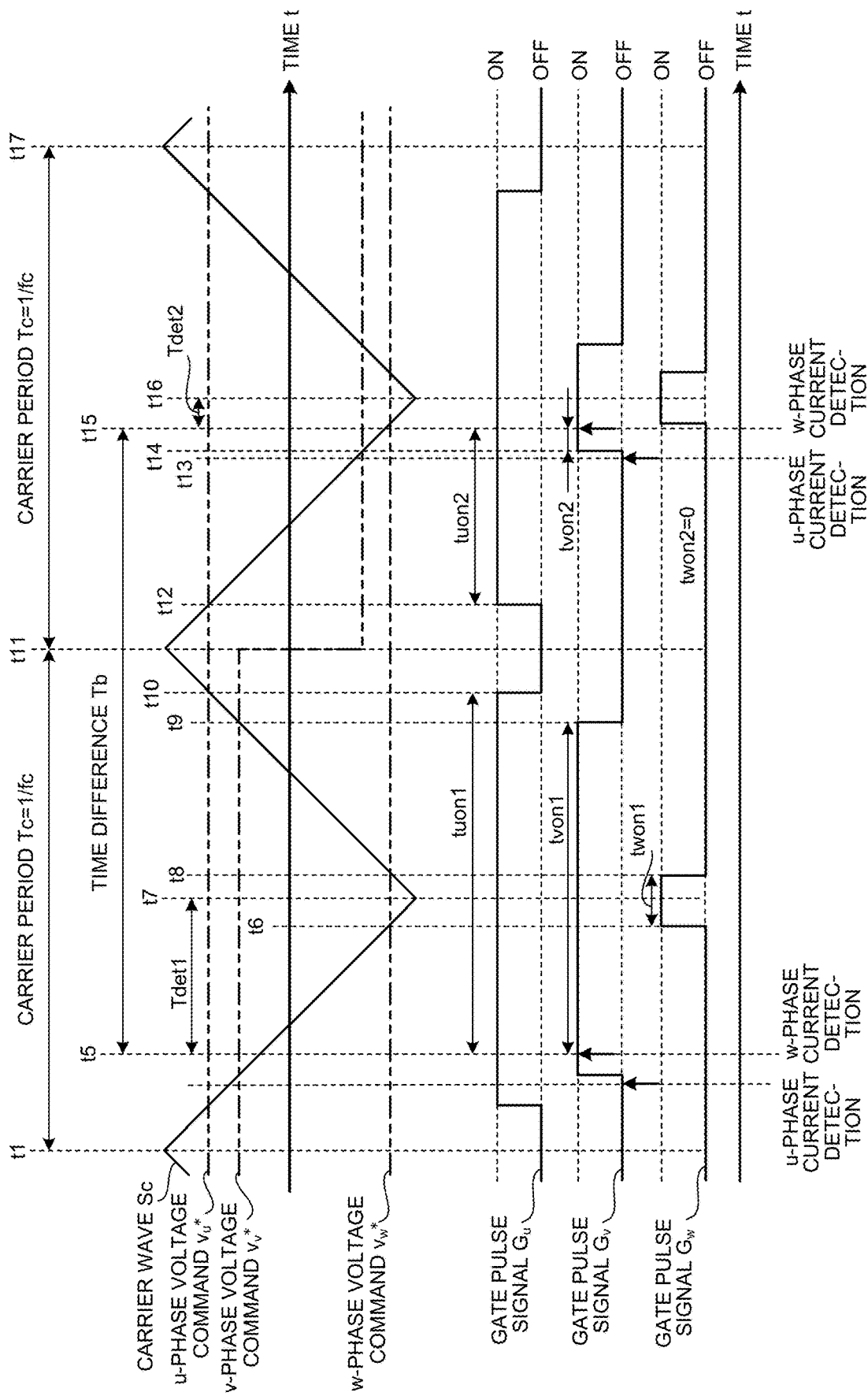
FIG. 19 is a diagram for explaining a method of calculating the three phase voltages between current detection times by the inter-detection-time voltage computation unit according to the third embodiment.

FIG. 19 is a diagram for explaining a method of calculating the three phase voltages between current detection times by the inter-detection-time voltage computation unit according to the third embodiment. In the example illustrated in FIG. 19, time t5, which is the time of detection of the bus current $i_{bus}$ used to determine the value of the current of the second phase in the first phase current determination period, is identified as the first current detection time. In addition, time t15, which is the time of detection of the bus current $i_{bus}$ used to determine the value of the current of the same second phase in the next phase current determination period, is identified as the next current detection time. Therefore, in the example illustrated in FIG. 19, the time difference Tb between the current detection times is obtained as Tb=t15−t5. Note that in FIG. 19, the gate pulse signals $G_u$, $G_v$, and $G_w$ are not subjected to pulse shift processing by the pulse shift processing unit 22.

The inter-detection-time voltage computation unit 14 can calculate the value of the u-phase voltage $v_{ub}$ between the current detection times through the computation of Formula (28) below. In Formula (28), "tuon1" represents the on-period of the u-phase gate pulse signal $G_u$ in the first half between the current detection times, and "tuon2" represents the on-period of the u-phase gate pulse signal $G_u$ in the second half between the current detection times. In addition, "$V_{dc}$" represents the bus voltage which is detected by a bus voltage detection means (not illustrated). Note that if the bus voltage is constant, the bus voltage detection means need not be used.

[Formula 28]

$$v_{ub} = \frac{v_{dc}}{2}\left\{2\left(\frac{tuon1 + tuon2}{tb}\right) - 1\right\} \neq v_u^* \quad (28)$$

Similarly, the inter-detection-time voltage computation unit 14 can calculate the value of the v-phase voltage $v_{vb}$ between the current detection times and the value of the w-phase voltage $v_{wb}$ between the current detection times through the computation of Formulas (29) and (30) below. In Formula (29), "tvon1" represents the period of time during which the v-phase gate pulse signal $G_v$ is in the on state in the first half between the current detection times, and "tvon2" represents the period of time during which the v-phase gate pulse signal $G_v$ is in the on state in the second half between the current detection times. In addition, in Formula (30), "twon1" represents the period of time during which the w-phase gate pulse signal $G_w$ is in the on state in the first half between the current detection times, and "twon2" represents the period of time during which the w-phase gate pulse signal $G_w$ is in the on state in the second half between the current detection times.

[Formula 29]

$$v_{vb} = \frac{v_{dc}}{2}\left\{2\left(\frac{tvon1 + tvon2}{tb}\right) - 1\right\} \neq v_v^* \quad (29)$$

[Formula 30]

$$v_{wb} = \frac{v_{dc}}{2}\left\{2\left(\frac{twon1 + twon2}{tb}\right) - 1\right\} \neq v_w^* \quad (30)$$

Since the detection times of the bus current $i_{bus}$ for use in the phase current determination unit 12 fluctuate, the time difference Tb between current detection times mostly does not coincide with the period of the carrier wave Sc. In most cases, therefore, the value of the u-phase voltage $v_{ub}$ between current detection times does not match the voltage command $v_u^*$. For the same reason, in most cases, the value of the v-phase voltage $v_{vb}$ does not match the voltage command $v_v^*$, and the value of the w-phase voltage $v_{wb}$ does not match the voltage command $v_w^*$. As a result, the use of the voltage commands $v_u^*$, $v_v^*$, and $v_w^*$ for speed estimation and position estimation causes errors in speed estimation and position estimation due to voltage errors.

In a case where the phase current determination unit 12 performs the process for determining the three phase currents $i_u$, $i_v$, and $i_w$ once every period of the carrier wave Sc, the time difference Tb between current detection times fluctuates in the range of 0.5×Tc<Tb<1.5×Tc relative to the carrier period Tc. In this case, voltage errors fluctuate greatly, and errors in speed estimation and position estimation also fluctuate greatly.

The estimation unit 15B performs speed estimation and position estimation, using the values of the three phase voltages $v_{ub}$, $v_{vb}$, and $v_{wb}$ between current detection times calculated by the inter-detection-time voltage computation unit 14. The estimation unit 15B can therefore perform speed estimation and position estimation with high estimation accuracy.

The estimation unit 15B performs coordinate transformation of the three phase voltages $v_{ub}$, $v_{vb}$, and $v_{wb}$ between current detection times calculated by the inter-detection-time voltage computation unit 14, into the voltages $v_\alpha$ and $v_\beta$ in the stationary coordinate system. Thus, the estimation unit 15B is different from the estimation units 15 and 15A in using the voltages $v_\alpha$ and $v_\beta$ in the stationary coordinate system obtained through coordinate transformation of the three phase voltages $v_{ub}$, $v_{vb}$, and $v_{wb}$ between current detection times, instead of the voltage commands $v_u^*$, $v_v^*$, and $v_w^*$.

In a case where the estimation unit 15B is provided by an algorithm such as an adaptive observer that calculates the speed from a state quantity estimation error, the estimation unit 15B calculates the difference between an estimated value of the state quantity and the true value to measure the error. In the adaptive observer illustrated in FIG. 16, the subtractor 72 calculates the difference between the estimated current vector and the current vector. In the presence of a time gap between the estimated current vector and the current vector, the process for calculating the difference between the estimated current vector and the current vector may fail to produce an accurate calculation result of the difference between the estimated current vector and the current vector. As described above, the current estimator 71 of the estimation unit 15B can accurately obtain the estimated current vector at the current detection time by using the values of the three phase voltages $v_{ub}$, $v_{vb}$, and $v_{wb}$ between current detection times.

An example of a method for calculating the values of the three phase voltages $v_{ub}$, $v_{vb}$, and $v_{wb}$ between current detection times by the inter-detection-time voltage computation unit 14 will be specifically described. First, an example of a method for detecting the on-period of each of the gate pulse signals $G_u$, $G_v$, and $G_w$ between current detection times will be described.

The on-period calculation unit 41 of the inter-detection-time voltage computation unit 14 divides the length of time between current detection times into three or more sections. The on-period calculation unit 41 obtains, for each of the gate pulse signals $G_u$, $G_v$, and $G_w$, the on-period during which the individual gate pulse signals $G_u$, $G_v$, and $G_w$ are in the on states in each of those three or more sections. The on-period calculation unit 41 adds up the on-periods in the three or more sections for each of the gate pulse signals $G_u$, $G_v$, and $G_w$ to calculate the on-period between the current detection times for each of the gate pulse signals $G_u$, $G_v$, and $G_w$. Consequently, the on-period calculation unit 41 can accurately calculate the on-period of each of the gate pulse signals $G_u$, $G_v$, and $G_w$ between the current detection times.

The following description is made giving an example of the on-period of the gate pulse signal $G_u$ among the on-periods of the gate pulse signals $G_u$, $G_v$, and $G_w$ between current detection times. The on-period calculation unit 41 of the inter-detection-time voltage computation unit 14 calculates each of the on-period tuon1 and the on-period tuon2, and adds up the on-period tuon1 and the on-period tuon2 to obtain the on-period of the gate pulse signal $G_u$.

First, a method for calculating the on-period tuon1 will be described. Relative times each of which is a length of time from the time of a vertex of the carrier wave Sc to a current detection time are defined as Tdet1 and Tdet2. In the example illustrated in FIG. 19, a vertex of the carrier wave Sc is a trough of the carrier wave Sc. The times of the troughs of the carrier wave Sc are times t7 and t16.

The relative time Tdet1 is the length of time from time t5, which is a current detection time, to time t7 when the carrier wave Sc reaches the vertex. The relative period of time Tdet2 is the length of time from time t15, which is a current detection time, to time t16 when the carrier wave Sc reaches the vertex. The phase current determination unit 12 can calculate the relative times Tdet1 and Tdet2 indicating a relative time difference between the timing when the carrier wave Sc reaches a vertex and a current detection time. The phase current determination unit 12 notifies the inter-detection-time voltage computation unit 14 of the calculated relative times Tdet1 and Tdet2.

FIG. 19 depicts an example in which the above-described pulse shift processing is not performed. However, in a case where the pulse shift processing is performed on the gate pulse signal $G_u$, the timings when the gate pulse signal $G_u$ switches between the on state and the off state change. Since the on-period tuon1 extends from within the falling half period into the rising half period of the carrier wave Sc, the pulse shift processing will change the time width of the on-period tuon1 in the falling half period of the carrier wave Sc and the time width thereof in the rising half period. For this reason, the on-period calculation unit 41 divides the on-period tuon1 into those which extend within the falling half period and the rising half period in calculating the on-period tuon1.

The carrier cycle from time t1 to time t11 is defined as a first carrier period, and the carrier cycle from time t11 to time t17 is defined as a second carrier period. In the falling half period of the first carrier period, at time t5 when the value of the bus current $i_{bus}$ is detected for use in determining the value of the w-phase current $i_w$ which is the current of the second phase, the u-phase gate pulse signal $G_u$ has already switched from the off state to the on state. The on-period tuon1 therefore has the same length of time in the falling half period as the relative time Tdet1. In this case, the on-period calculation unit 41 determines that the on-period tuon1 is the same length of time in the falling half cycle as the relative time Tdet1.

If the u-phase gate pulse signal $G_u$ has not switched from the off state to the on state at time t5, a length of time of the on-period tuon1 in the falling half period can be obtained from the u-phase gate pulse signal $G_u$. For example, the on-period calculation unit 41 can calculate the length of time from the time when the u-phase gate pulse signal $G_u$ switches from the off state to the on state to time t7 of the vertex of the carrier wave Sc. The thus calculated length of time is the length of time of the on-period tuon1 in the falling half period.

The on-period calculation unit 41 calculates, from the u-phase gate pulse signal $G_u$, a length of time of the on-period tuon1 in the rising half period. The on-period calculation unit 41 can calculate the length of time from time t7 of the vertex of the carrier wave Sc to the time when the u-phase gate pulse signal $G_u$ switches from the on state to the off state. The thus calculated length of time is the length of time of the on-period tuon1 in the rising half period.

Next, a method for calculating the on-period tuon2 will be described. The on-period calculation unit 41 can obtain the on-period tuon2 by calculating the on-period of the u-phase gate pulse signal $G_u$ in the falling half period of the second carrier period and subtracting the relative time Tdet2 from the calculated on-period. For example, the on-period calculation unit 41 calculates the length of time in the second carrier period from time t12 when the u-phase gate pulse signal $G_u$ switches from the off state to the on state to time t16 of the vertex of the carrier wave Sc. The on-period calculation unit 41 obtains the on-period tuon2 by subtracting the relative time Tdet2 from the calculated length of time from time t12 to time t16. It is to be noted that the on-period calculation unit 41 forcibly sets the on-period tuon2 to zero when the calculation result is negative because the minimum value of the on-period tuon2 is zero.

The phase current determination unit 12 can also calculate the time difference Tb between current detection times on the basis of the times Tdet1 and Tdet2. The fluctuation $\Delta T(t)$ of the time difference Tb between current detection times is the difference between the relative time Tdet1 and the relative time Tdet2. In addition, the time difference Tb between current detection times is obtained by adding the fluctuation $\Delta T(t)$ to the carrier period Tc. The phase current determination unit 12 can calculate the time difference Tb between current detection times through the computation of Formula (31) below.

[Formula 31]

$$Tb = Tc + (Tdet1 - Tdet2) \quad (31)$$

As described above, the control device 5B according to the third embodiment can calculate the time difference Tb between current detection times and the values of the three phase voltages $v_{ub}$, $v_{vb}$, and $v_{wb}$ between the current detection times on the basis of the relative times Tdet1 and Tdet2 without detecting the absolute current detection times.

Note that the on-period calculation unit 41 can also calculate the on-periods of the gate pulse signals $G_u$, $G_v$, and $G_w$ on the basis of the three-phase voltage commands $v_u^*$, $v_v^*$, and $v_w^*$ instead of the gate pulse signals $G_u$, $G_v$, and $G_w$. In this case, the on-period calculation unit 41 calculates, from the magnitude of the three-phase voltage commands $v_u^*$, $v_v^*$, and $v_w^*$, the times when the gate pulse signals $G_u$, $G_v$, and $G_w$ switch from the off states to the on states. In addition, the time after a lapse of the period of time TA from the switching of the gate pulse signal G of the intermediate phase from the off state to the on state is calculated. Then, the on-period calculation unit 41 can calculate the on-periods of the gate pulse signals $G_u$, $G_v$, and $G_w$ on the basis of the times when the gate pulse signals $G_u$, $G_v$, and $G_w$ switch from the off states to the on states and the time after a lapse of the period of time TA from the switching of the gate pulse signal G of the intermediate phase from the off state to the on state.

As discussed above, the on-period calculation unit 41 of the inter-detection-time voltage computation unit 14 divides the length of time between current detection times into three sections, and obtains the on-period of the gate pulse signal G for each of these three sections. The on-period calculation unit 41 calculates the on-period of the gate pulse signal G between the current detection times by adding up the on-periods in the three sections. In the above-described example, the three sections are the falling half period in which the first current detection is performed, the rising half period in which no current detection is performed, and the falling half period in which the next current detection is performed. The on-period calculation unit 41 of the inter-detection-time voltage computation unit 14 calculates the duty ratio of the gate pulse signal G between the current detection times by dividing the on-period of the gate pulse signal G between the current detection times by the time difference Tb between the current detection times. The voltage calculation unit 42 of the inter-detection-time voltage computation unit 14 calculates, from the duty ratio of the gate pulse signal G between the current detection times, the voltage between the current detection times.

Even in a case where the cycle of phase current detection by the phase current determination unit 12 is 1.5 times or more a period of the carrier wave Sc, the inter-detection-time voltage computation unit 14 can calculate the voltage between current detection times by dividing the period between the current detection times into four or more sections for separate calculations.

In the above-described example, the inter-detection-time voltage computation unit 14 calculates the period during which the gate pulse signals $G_u$, $G_v$, and $G_w$ are in the on states, but can also calculate the period during which the gate pulse signals $G_u$, $G_v$, and $G_w$ are in the off states. The lengths of the falling half period and the rising half period of the carrier wave Sc are known. By calculating the period during which the gate pulse signals $G_u$, $G_v$, and $G_w$ are in the off states between current detection times, therefore, it is possible to indirectly obtain the period of time during which the gate pulse signals $G_u$, $G_v$, and $G_w$ are in the on states between the current detection times.

As described above, in most cases, the time difference Tb between current detection times does not coincide with the carrier period Tc, and fluctuates more greatly as the AC motor 1 rotates at higher speeds. In addition, as described with reference to FIGS. 8 and 9, the waveform of the intermediate phase includes a 3n-th-order frequency component relative to the fundamental frequency of the three-phase voltage commands $v_u^*$, $v_v^*$, and $v_w^*$. Numeral "n" is an integer of one or more. When the AC motor 1 rotates at high speed, therefore, a gap between the carrier period Tc and the time difference Tb between current detection times is significant at a period of an electrical angle 3f. The electrical angle 3f is a frequency of three times the electrical angular frequency of the AC motor 1.

Figure 20:
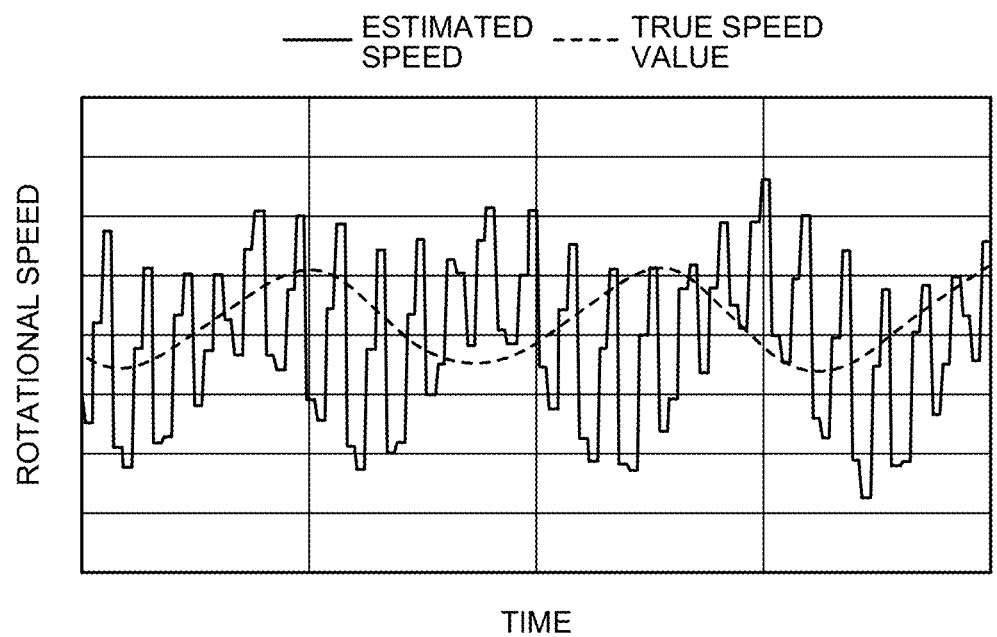
FIG. 20 is a diagram illustrating an exemplary result of speed estimation with the time difference between current detection times being a fixed value, according to the third embodiment.
Figure 21:
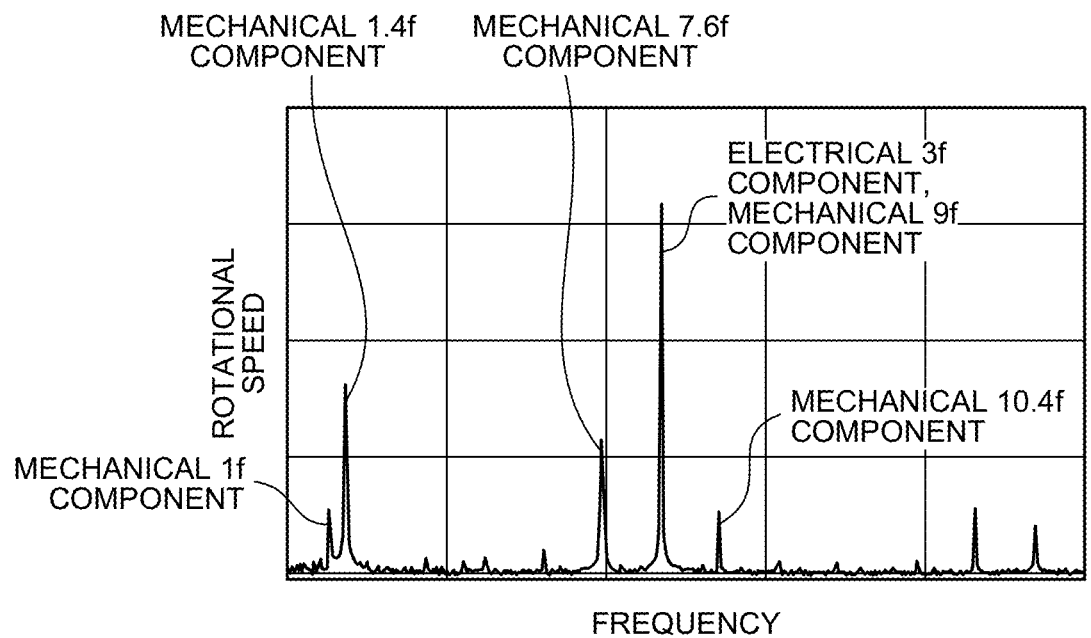
FIG. 21 is a diagram illustrating the result of fast Fourier transform (FFT) analysis of the speed estimation result illustrated in FIG. 20.

FIG. 20 is a diagram illustrating an exemplary result of speed estimation with the time difference between current detection times being a fixed value, according to the third embodiment. FIG. 21 is a diagram illustrating the result of FFT analysis of the speed estimation result illustrated in FIG. 20. In FIGS. 20 and 21, the frequency of the pulsation load is equal to the rotation frequency of the rotation shaft of the AC motor 1, and the number of pole pairs of the AC motor 1 is three. In FIG. 20, the vertical axis represents the rotational speed $\omega_e$ of the AC motor 1, and the horizontal axis represents time. In FIG. 21, the vertical axis represents the rotational speed $\omega_e$ of the AC motor 1, and the horizontal axis represents frequency. Hereinafter, the electrical frequency that is the frequency of the phase voltages or the phase currents of the AC motor 1 is denoted by "$f_e$", and the mechanical frequency that is the rotation frequency of the rotation shaft of the AC motor 1 is denoted by "$f_m$". Note that the relationship between the rotational speed $\omega_e$ and the electrical frequency $f_e$ here is expressed by $\omega_e=2\pi \cdot f_e$. $\pi$ is the circular constant. In addition, the relationship between the electrical frequency $f_e$ and the mechanical frequency $f_m$ is expressed by $f_e=P_m \cdot f_m$, where "$P_m$" represents the number of pole pairs of the AC motor 1.

As illustrated in FIG. 20, when the time difference Tb between current detection times is a fixed value, the waveform of the estimated speed has a larger high-frequency oscillating component than the true speed value. As illustrated in FIG. 21, the FFT analysis of the estimated speed illustrated in FIG. 20 shows that the main component of the oscillation is a frequency component of three times the electrical frequency $f_e$ of the AC motor 1. In the case of using one-shunt current detection, current detection times change at a frequency of three times the electrical frequency $f_e$, but a large error occurs in the estimated speed as illustrated in FIG. 20 because the fluctuation of the time difference Tb between current detection times is ignored. In addition, as illustrated in FIG. 20, the true speed value oscillates at a frequency equal to the mechanical frequency $f_m$ due to the influence of the pulsation load, but the waveform of the estimated speed has a peak at a frequency of 1.4 times the mechanical frequency $f_m$, with which this oscillation is covered. Therefore, the pulsation of the frequency equal to the mechanical frequency $f_m$ is hardly seen.

As described above, the number of pole pairs of the AC motor 1 is three, but there are peaks of the mechanical 7.6f component and the mechanical 10.4f component as side bands of the electrical 3f component and the mechanical 9f component. The electrical 3f component is a frequency component of three times the electrical frequency $f_e$, and the mechanical 9f component is a frequency component of nine times the mechanical frequency $f_m$. In addition, the mechanical 7.6f component is a frequency component of 7.6 times the mechanical frequency $f_m$, and the mechanical 10.4f component is a frequency component of 10.4 times the mechanical frequency $f_m$.

As discussed above, speed estimation with the time difference Tb between current detection times being a fixed value produces speed estimation errors of components that are not included in the true speed value due to changes in current detection times associated with one-shunt current detection and voltage errors accompanying the changes in current detection times.

Figure 22:
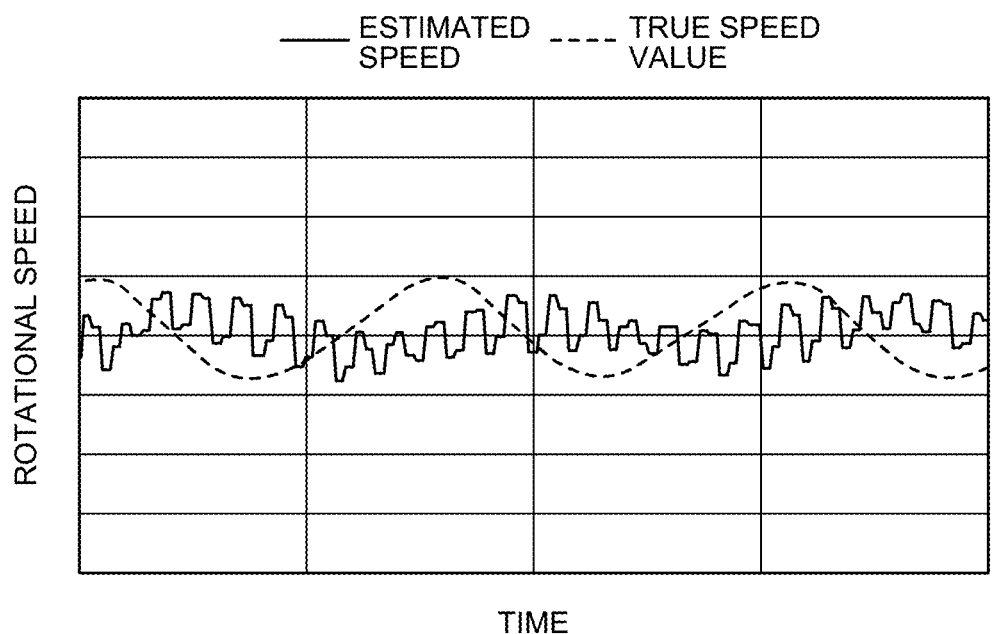
FIG. 22 is a diagram illustrating an exemplary result of speed estimation by an estimation unit according to the third embodiment.
Figure 23:
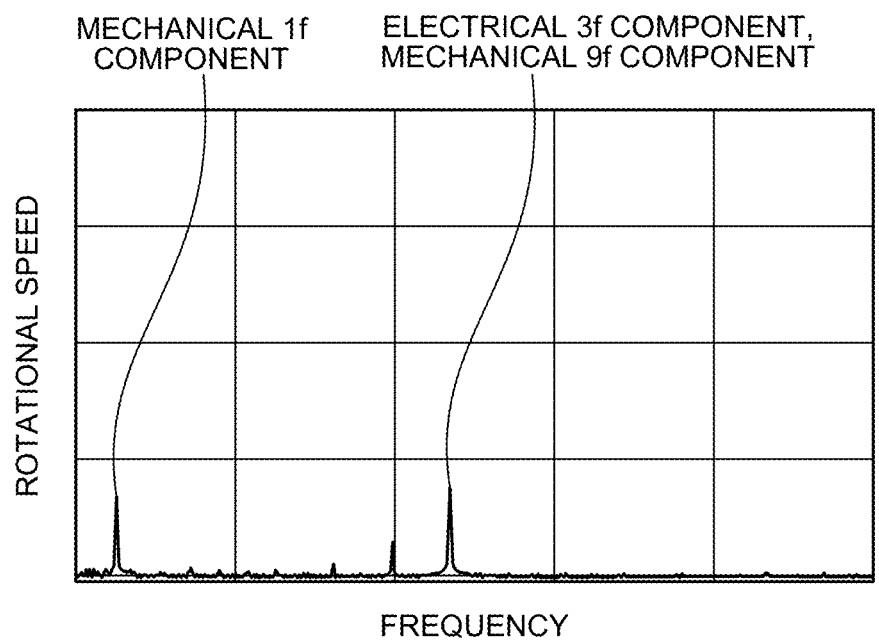
FIG. 23 is a diagram illustrating the result of FFT analysis of the speed estimation result illustrated in FIG. 22.

FIG. 22 is a diagram illustrating an exemplary result of speed estimation by the estimation unit according to the third embodiment. FIG. 23 is a diagram illustrating the result of FFT analysis of the speed estimation result illustrated in FIG. 22. In FIGS. 22 and 23, the frequency of the pulsation load is equal to the mechanical frequency $f_m$, and the number of pole pairs of the AC motor 1 is three. In FIG. 22, the vertical axis represents the rotational speed $\omega_e$ of the AC motor 1, and the horizontal axis represents time. In FIG. 23, the vertical axis represents the rotational speed $\omega_e$ of the AC motor 1, and the horizontal axis represents frequency.

The estimation unit 15B according to the third embodiment performs speed estimation on the basis of the time difference Tb between current detection times identified by the phase current determination unit 12 and the values of the phase voltages $v_{ub}$, $v_{vb}$, and $v_{wb}$ between the current detection times calculated by the inter-detection-time voltage computation unit 14. Consequently, the estimation unit 15B can significantly reduce errors in speed estimation as illustrated in FIGS. 22 and 23. Similarly, the estimation unit 15B according to the third embodiment performs position estimation on the basis of the time difference Tb between current detection times detected by the phase current determination unit 12 and the values of the phase voltages $v_{ub}$, $v_{vb}$, and $v_{wb}$ between the current detection times identified by the inter-detection-time voltage computation unit 14. Consequently, the estimation unit 15B can significantly reduce errors in position estimation.

As described above, the estimation device 9B according to the third embodiment includes the inter-detection-time voltage computation unit 14 that calculates, on the basis of the voltage commands $v_u^*$, $v_v^*$, and $v_w^*$, the values of the phase voltages $v_{ub}$, $v_{vb}$, and $v_{wb}$ applied from the voltage-source inverter 4 to the AC motor 1 between current detection times. The inter-detection-time voltage computation unit 14 is an example of a phase voltage calculation unit. The estimation unit 15B calculates the estimated position $\theta_e\hat{}$ and the estimated speed $\omega_e\hat{}$ on the basis of the values of the phase currents $i_u$, $i_v$, and $i_w$, the time difference Tb, and the values of the phase voltages $v_{ub}$, $v_{vb}$, and $v_{wb}$ calculated by the inter-detection-time voltage computation unit 14.

In addition, the inter-detection-time voltage computation unit 14 includes the on-period calculation unit 41 and the voltage calculation unit 42. The on-period calculation unit 41 calculates the on-period during which each of the plurality of gate pulse signals $G_u$, $G_v$, and $G_w$ is in the on state between current detection times. The voltage calculation unit 42 calculates the values of the phase voltages $v_{ub}$, $v_{vb}$, and $v_{wb}$ on the basis of the value of the bus voltage $V_{dc}$, the on-period calculated by the on-period calculation unit 41, and the time difference Tb calculated by the time difference calculation unit 13. Consequently, the inter-detection-time voltage computation unit 14 can calculate the values of the phase voltages $v_{ub}$, $v_{vb}$, and $v_{wb}$ between the current detection times from the gate pulse signals $G_u$, $G_v$, and $G_w$.

In addition, the on-period calculation unit 41 divides the period between current detection times into three or more sections, and obtains, for each of the three or more sections, the on-period during which each of the plurality of gate pulse signals $G_u$, $G_v$, and $G_w$ is in the on state. The on-period calculation unit 41 calculates the on-period of each gate pulse signal G between the current detection times by adding up the on-periods in the three or more sections for each gate pulse signal G. Consequently, the inter-detection-time voltage computation unit 14 can accurately calculate the on-period of each of the gate pulse signals $G_u$, $G_v$, and $G_w$ between the current detection times.

Fourth Embodiment

In the fourth embodiment, the configuration of other parts of an AC motor drive device than the estimation device and the voltage-source inverter described above will be specifically described. In the following description, components having the same functions as those in the third embodiment are denoted by the same reference signs, and descriptions thereof are omitted. The difference from the electric motor system 100B according to the third embodiment is mainly described.

Figure 24:
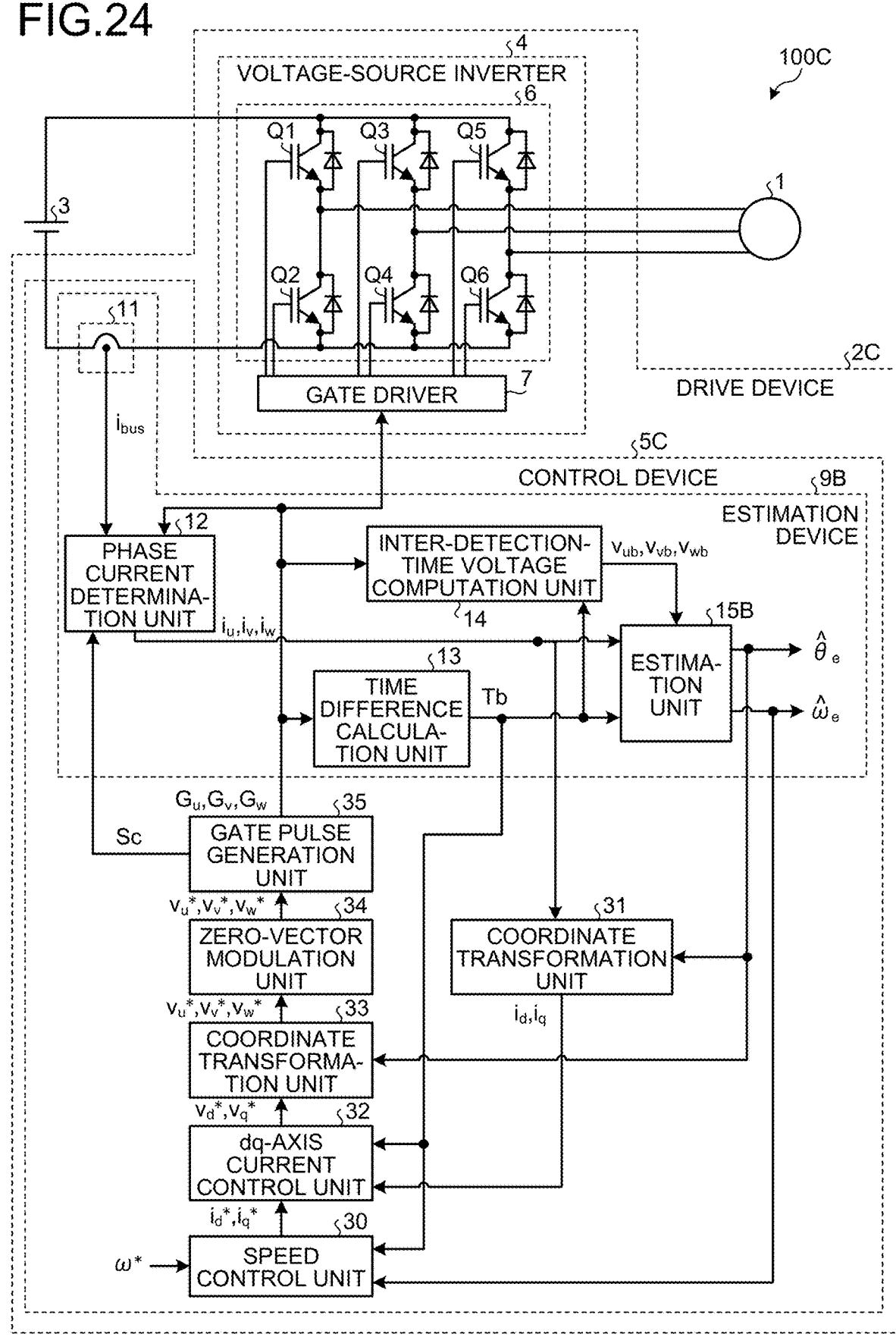
FIG. 24 is a diagram illustrating an exemplary configuration of an electric motor system according to a fourth embodiment of the present invention.

FIG. 24 is a diagram illustrating an exemplary configuration of an electric motor system according to the fourth embodiment of the present invention. As illustrated in FIG. 24, the electric motor system 100C includes the AC motor 1 and a drive device 2C. The drive device 2C includes the voltage-source inverter 4 and a control device 5C. The control device 5C includes the estimation device 9B, a speed control unit 30, coordinate transformation units 31 and 33, a dq-axis current control unit 32, the zero-vector modulation unit 34, and the gate pulse generation unit 35. Note that the control device 5C may include the estimation device 9 or the estimation device 9A, instead of the estimation device 9B. Note that the control device 5C is configured to perform sensorless vector control on the basis of the dq coordinate system, but may use other control methods or coordinate systems.

The speed control unit 30 generates a d-axis current command $i_d^*$ and a q-axis current command $i_q^*$ such that the estimated speed $\hat{\omega}_e$ calculated by the estimation device 9B matches a speed command $\omega^*$. The speed control unit 30 includes a feedback controller such as a proportional integral differential (PID) controller, but may include a controller other than the feedback controller. In addition, the speed control unit 30 may be configured to include a feedforward controller in parallel with the PID controller for accelerated control response. Moreover, the speed control unit 30 may be configured to include a vibration reduction controller for repetitive control or the like in combination with the PID controller so as to enhance disturbance response at a specific frequency.

The q-axis current command $i_q^*$ is determined such that the deviation between the estimated speed $\hat{\omega}_e$ and the speed command $\omega^*$ converges to zero, but the method for determining the d-axis current command $i_d^*$ can be variously changed depending on the type of the AC motor 1. For example, in a case where the AC motor 1 is a surface permanent magnet type synchronous motor, the speed control unit 30 can perform "$i_d$=0 control", which is a control method for setting the d-axis current command $i_d^*$ to zero under a situation where the voltage is not saturated. Copper loss can be reduced by "$i_d$=0 control". In addition, in a case where the AC motor 1 is a permanent magnet embedded synchronous motor, reluctance torque can also be used, and thus the speed control unit 30 can also perform "maximum torque per ampere control". The "maximum torque per ampere control" is a control method for giving the d-axis current command $i_d^*$ in the negative direction, and can reduce copper loss. In addition, the speed control unit 30 can also perform flux weakening control, which is a control method for giving the larger d-axis current command $i_d^*$ in the negative direction. The flux weakening control can increase the mechanical output in exchange for an increase in copper loss during voltage saturation, whether the AC motor 1 is a surface permanent magnet type synchronous motor or a permanent magnet embedded synchronous motor.

On the basis of the estimated position $\hat{\theta}_e$ calculated by the estimation device 9B, the coordinate transformation unit 31 converts through coordinate transformation the phase currents $i_u$, $i_v$, and $i_w$ into the d-axis current $i_d$ and the q-axis current $i_q$, which are currents in the dq coordinate system.

The dq-axis current control unit 32 adjusts a d-axis voltage command $v_d^*$ such that the d-axis current $i_d$ matches the d-axis current command $i_d^*$, and adjusts a q-axis voltage command $v_q^*$ such that the q-axis current $i_q$ matches the q-axis current command $i_q^*$. The dq-axis current control unit 32 includes, for example, a proportional integral differential (PID) controller (not illustrated) that performs feedback control of the d-axis current $i_d$, a PID controller (not illustrated) that performs feedback control of the q-axis current $i_q$, and a non-interference control (not illustrated) that performs feedforward compensation on a dq-axis interference component.

As discussed above, the dq-axis current control unit 32 individually controls the d-axis current $i_d$ and the q-axis current $i_q$ in the dq coordinate system, thereby achieving good current control performance. Note that the speed control unit 30 and the dq-axis current control unit 32 include differentiation and integration, and the dq-axis current control unit 32 prevents errors in differentiation and integration, using the time difference Tb between current detection times.

The coordinate transformation unit 33 performs coordinate transformation of the d-axis voltage command $v_d^*$ and the q-axis voltage command $v_q^*$ into the voltage commands $v_u^*$, $v_v^*$, and $v_w^*$ on the basis of the estimated position $\hat{\theta}_e$ calculated by the estimation device 9B. The zero-vector modulation unit 34 performs zero-vector modulation on the voltage commands $v_u^*$, $v_v^*$, and $v_w^*$ obtained through coordinate transformation by the coordinate transformation unit 33. The gate pulse generation unit 35 generates the gate pulse signals $G_u$, $G_v$, and $G_w$ on the basis of the voltage commands $v_u^*$, $v_v^*$, and $v_w^*$, and outputs the generated gate pulse signals $G_u$, $G_v$, and $G_w$ to the voltage-source inverter 4. Since the gate pulse generation unit 35 includes the pulse shift processing unit 22 as described above, the values of the three-phase currents can be determined by the phase current determination unit 12 regardless of the values of the voltage commands $v_u^*$, $v_v^*$, and $v_w^*$. For this reason, the estimation device 9B can further improve the accuracy of position estimation and speed estimation, and can further enhance the control performance.

As described above, the estimation unit 15B of the estimation device 9B performs speed estimation and position estimation on the basis of the time difference Tb between current detection times provided by one-shunt current detection and the voltage between the current detection times that changes with the time difference Tb between the current detection times. That is, the estimation unit 15B performs speed estimation and position estimation on the basis of the time difference Tb between current detection times detected by the phase current determination unit 12 and the voltage between the current detection times calculated by the inter-detection-time voltage computation unit 14. Consequently, the estimation device 9B can significantly reduce errors in speed estimation and position estimation.

Figure 25:
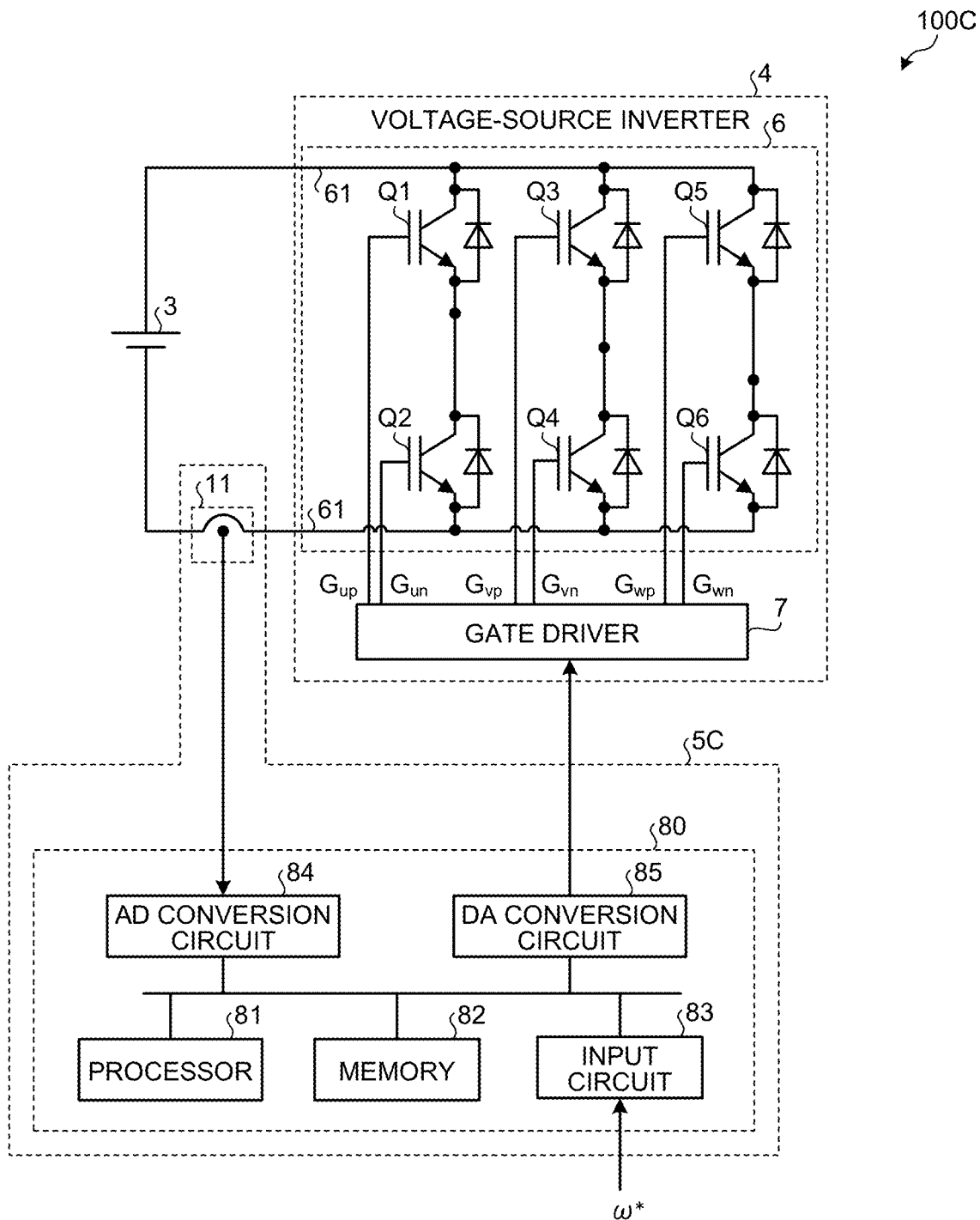
FIG. 25 is a diagram illustrating an exemplary hardware configuration of a control device according to the fourth embodiment.

FIG. 25 is a diagram illustrating an exemplary hardware configuration of the control device according to the fourth embodiment. As illustrated in FIG. 25, the control device 5C according to the fourth embodiment includes the bus current detection unit 11 and processing circuitry 80. The processing circuitry 80 includes a processor 81, a memory 82, an input circuit 83, an analog-to-digital (AD) conversion circuit 84, and a digital-to-analog (DA) conversion circuit 85. The processor 81 includes one or more of a central processing unit (CPU), a digital signal processer (DSP), and a system large scale integration (LSI). The memory 82 includes one or more of a random access memory (RAM), a read only memory (ROM), a flash memory, an erasable programmable read only memory (EPROM), and an electrically erasable programmable read only memory (EEPROM, registered trademark). The memory 82 also includes a recording medium on which a computer-readable program is recorded. Such a recording medium includes one or more of a non-volatile or volatile semiconductor memory, a magnetic disk, a flexible memory, an optical disk, a compact disk, and a digital versatile disc (DVD).

The processor 81 reads and executes a program stored in the recording medium of the memory 82 to execute the functions of the phase current determination unit 12, the time difference calculation unit 13, the inter-detection-time voltage computation unit 14, and the estimation unit 15B. The input circuit 83 notifies the processor 81 of the three-phase voltage commands $v_u^*$, $v_v^*$, and $v_w^*$ or the speed command ω* input from outside. The processor 81 performs the process for estimating the magnetic pole position $θ_e$ and the rotational speed $ω_e$ on the basis of the three-phase voltage commands $v_u^*$, $v_v^*$, and $v_w^*$ or the speed command ω* input from outside. The AD conversion circuit 84 converts the value of the bus current $i_{bus}$ detected by the bus current detection unit 11 from an analog signal to a digital signal. The processor 81 acquires the digitized value of the bus current $i_{bus}$ from the AD conversion circuit 84, and performs processing based on the acquired value of the bus current $i_{bus}$. The processor 81 also modulates the three-phase voltage commands $v_u^*$, $v_v^*$, and $v_w^*$ to generate the gate pulse signals $G_u$, $G_v$, and $G_w$, and outputs the generated gate pulse signals $G_u$, $G_v$, and $G_w$ to the DA conversion circuit 85. The DA conversion circuit 85 converts the gate pulse signals $G_u$, $G_v$, and $G_w$ from digital signals to analog signals, and outputs the analog gate pulse signals $G_u$, $G_v$, and $G_w$ to the gate driver 7. Note that if a modulation means is provided in the gate driver 7, the processor 81 can transmit the three-phase voltage commands $v_u^*$, $v_v^*$, and $v_w^*$ to the gate driver 7. In this case, the three-phase voltage commands $v_u^*$, $v_v^*$, and $v_w^*$ may be either digital values or analog values.

Data is transmitted and received among the processor 81, the memory 82, the input circuit 83, the AD conversion circuit 84, and the DA conversion circuit 85. Data is transmitted and received as digital signals, but may be transmitted and received as analog signals. The method of data transmission/reception may be parallel communication or serial communication. Analog signals and digital signals may be appropriately converted by a converter (not illustrated).

Note that the estimation devices 9 and 9A according to the first and second embodiments can also be implemented by the hardware configuration illustrated in FIG. 25 similarly to the estimation device 9B according to the fourth embodiment. The processor 81 can read and execute a program stored in the recording medium of the memory 82 to execute the functions of the phase current determination unit 12, the time difference calculation unit 13, and the estimation unit 15. Similarly, the processor 81 can read and execute a program stored in the recording medium of the memory 82 to execute the functions of the phase current determination unit 12, the time difference calculation unit 13, and the estimation unit 15A.

In addition to the functions of the estimation devices 9, 9A, and 9B, the processor 81 can also execute some or all of the functions of the speed control unit 30, the coordinate transformation units 31 and 33, the dq-axis current control unit 32, the zero-vector modulation unit 34, and the gate pulse generation unit 35. In this case, the processor 81 reads and executes a program stored in the memory 82 to execute the functions of the speed control unit 30, the coordinate transformation units 31 and 33, the dq-axis current control unit 32, the zero-vector modulation unit 34, and the gate pulse generation unit 35.

As described above, the drive device 2C according to the fourth embodiment uses the estimation device 9B having high accuracy of estimation of the magnetic pole position $θ_e$ and the rotational speed $ω_e$. The drive device 2C therefore provides the improved control performance for the AC motor 1 when the AC motor 1 rotates at high speed or when zero-vector modulation is performed.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST

1 AC motor; 2, 2A, 2B, 2C drive device; 3 DC power supply; 4 voltage-source inverter; 5, 5A, 5B, 5C control device; 6 main circuit; 7 gate driver; 9, 9A, 9B estimation device; 11 bus current detection unit; 12 phase current determination unit; 13 time difference calculation unit; 14 inter-detection-time voltage computation unit; 15, 15A, 15B estimation unit; 21 comparison unit; 22 pulse shift processing unit; 30 speed control unit; 31, 33 coordinate transformation unit; 32 dq-axis current control unit; 34 zero-vector modulation unit; 35 gate pulse generation unit; 41 on-period calculation unit; 42 voltage calculation unit; 51 model deviation computation unit; 52 angular velocity estimator; 53 primary angular frequency calculator; 54 integrator; DC bus; 71 current estimator; 72 subtractor; 73 deviation calculator; 100, 100A, 100B, 100C electric motor system; G, $G_u$, $G_v$, $G_w$, $G_{up}$, $G_{un}$, $G_{vp}$, $G_{vn}$, $G_{wp}$, $G_{wn}$ gate pulse signal; $i_{bus}$ bus current; $i_u$, $i_v$, $i_w$ phase current; Sc carrier wave; Tb time difference; tuon1, tuon2 on-period; $v_{ub}$, $v_{vb}$, $v_{wb}$ phase voltage; $v_u^*$, $v_v^*$, $v_w^*$ voltage command; $θ_e$ magnetic pole position; $\hat{ω_e}$ estimated position; $ω_e$ rotational speed; $\hat{ω_e}$ estimated speed.

The invention claimed is:
1. An estimation device comprising:
a bus current detector to detect a value of a bus current that is a current flowing through a DC bus of a voltage-source inverter driven by a plurality of gate pulse signals generated on a basis of a voltage command;
a processor to execute a program; and
a memory to store the program which when executed by the processor performs:
a phase current determination process of performing a determination process for determining values of a plurality of phase currents supplied from the voltage-source inverter to an AC motor on the basis of values of the bus current detected by the bus current detector and states of the plurality of gate pulse signals;
a time difference calculation process of calculating a time difference between a first current detection time identified as a time of detection of the bus current used in a previous determination process by the phase current determination process and a second current detection time identified as a time of detection of the bus current used in a present determination process by the phase current determination process; and
an estimation process of estimating at least one of a position and a speed, of the AC motor on the basis of the values of the plurality of phase currents determined by the phase current determination process and the time difference calculated by the time difference calculation process.

2. The estimation device according to claim 1, comprising
a phase voltage calculation process of calculating, on the basis of the voltage command, a value of a phase voltage applied from the voltage-source inverter to the AC motor between the first current detection time and the second current detection time, wherein
the estimation process
estimates at least one of the position and the speed of, the AC motor on the basis of the values of the plurality of phase currents, the time difference, and the value of the phase voltage calculated by the phase voltage calculation process.

3. The estimation device according to claim 2, wherein
the phase voltage calculation process includes:
an on-period calculation process of calculating an on-period during which each of the plurality of gate pulse signals is in an on state between the first current detection time and the second current detection time; and
a voltage calculation process of calculating the value of the phase voltage between the first current detection time and the second current detection time on the basis of a value of a voltage of the DC bus, the on-period calculated by the on-period calculation process, and the time difference calculated by the time difference calculation process.

4. The estimation device according to claim 3, wherein
the on-period calculation process
divides a length of time between the first current detection time and the second current detection time into three or more sections, obtains, for each of the three or more sections, an on-period during which each of the plurality of gate pulse signals is in the on state, and calculates the on-period between the first current detection time and the second current detection time by adding up the on-periods in the three or more sections.

5. The estimation device according to claim 1, wherein
the gate pulse signals are
generated on the basis of comparison between the voltage command and a carrier wave, and
the time difference is longer than a half period of the carrier wave and shorter than 1.5 times a period of the carrier wave.

6. The estimation device according to claim 1, wherein
the estimation process includes:
a state quantity estimation process of estimating a state quantity of the AC motor;
an error calculation process of calculating an error in the state quantity estimated by the state quantity estimation process; and
a speed estimation process of estimating the speed of the AC motor on the basis of the error in the state quantity calculated by the error calculation process, and
at least one of the state quantity estimation process and the speed estimation process performs computation based on the time difference.

7. An AC motor drive device comprising
the estimation device according to claim 1.

8. The AC motor drive device according to claim 7, comprising
a pulse shifter to temporally shift at least one of the plurality of gate pulse signals that are input to the voltage-source inverter, wherein
when an interval between changes in two gate pulse signals of the plurality of gate pulse signals is less than a preset period of time, the pulse shifter temporally shifts at least one of the two gate pulse signals to make the interval between the changes in the two gate pulse signals longer than or equal to the preset period of time.

9. The AC motor drive device according to claim 7, comprising
a zero-vector modulator to irregularly change an output ratio between two types of zero-voltage vectors output from the voltage-source inverter by adding a random number value to the voltage command.

* * * * *